US010187150B2

(12) United States Patent
Mizrahi et al.

(10) Patent No.: US 10,187,150 B2
(45) Date of Patent: *Jan. 22, 2019

(54) DIRECT COMMUNICATIVE COUPLING OF A RADIO SOURCE TO A REMOTE UNIT FOR EXCHANGING COMMUNICATIONS SERVICES WITH A DISTRIBUTED COMMUNICATIONS SYSTEM (DCS)

(71) Applicant: Corning Optical Communications Wireless Ltd, Airport (IL)

(72) Inventors: Gavriel Mizrahi, Tel Aviv (IL); Parwiz Shekalim, Netanya (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,110

(22) Filed: Jan. 10, 2018

(65) Prior Publication Data
US 2018/0131438 A1    May 10, 2018

Related U.S. Application Data

(63) Continuation of application No. 15/278,779, filed on Sep. 28, 2016, now Pat. No. 10,020,885.
(Continued)

(51) Int. Cl.
*H04J 14/00* (2006.01)
*H04B 10/25* (2013.01)
(Continued)

(52) U.S. Cl.
CPC ..... *H04B 10/2504* (2013.01); *H04B 7/15514* (2013.01); *H04W 72/04* (2013.01)

(58) Field of Classification Search
CPC ........ H04B 10/25753; H04B 10/25754; H04B 10/2575; H04B 10/25758; H04B 10/2504;
(Continued)

(56) References Cited

U.S. PATENT DOCUMENTS 6,804,527 B2 * 10/2004 Struhsaker ............ H04J 3/0694
370/350
7,809,073 B2 * 10/2010 Liu ........................ H04B 1/707
375/130
(Continued)

FOREIGN PATENT DOCUMENTS

CA      2938949 A1    8/2014
CN    204376563 U    6/2015
(Continued)

OTHER PUBLICATIONS

International Search Report and Written Opinion PCT/IL2016/051011 dated Jan. 2, 2017.

*Primary Examiner* — Hibret Woldekidan
(74) *Attorney, Agent, or Firm* — C. Keith Montgomery

(57) ABSTRACT

Direct communicative coupling of a base station(s) to a remote unit for exchanging communications services with a distributed communications system (DCS) is disclosed. For example, the remote unit may include a remote antenna unit that is provided in a distributed antenna system (DAS) as one type of DCS. In this manner, the remote unit can facilitate distribution of communications services from a base station into the DCS at locations other than at a centralized location in the DCS, such as at a central unit or head-end equipment. Various DCS configurations are possible that include a remote unit supporting the direct communicatively coupling to a base station(s) for distributing communications services in a DCS.

18 Claims, 10 Drawing Sheets

Related U.S. Application Data

(60) Provisional application No. 62/234,842, filed on Sep. 30, 2015.

(51) Int. Cl.
*H04W 72/04* (2009.01)
*H04B 7/155* (2006.01)

(58) Field of Classification Search
CPC .... H04B 7/15514; H04B 7/04; H04B 10/272; H04B 10/27; H04B 10/808; H04W 72/04; H04W 88/085; H04W 52/0206; H04W 84/12; H04W 88/00; H04J 14/0282
USPC ............ 398/115, 66, 67, 70, 71, 72, 73, 116
See application file for complete search history.

(56) References Cited

U.S. PATENT DOCUMENTS

| | | | |
|---|---|---|---|
| 9,037,143 B2 * | 5/2015 | Berlin | H04B 10/25758 |
| | | | 455/450 |
| 9,240,835 B2 * | 1/2016 | Berlin | H04B 7/2606 |
| 9,490,913 B2 * | 11/2016 | Berlin | H04L 12/10 |
| 9,497,693 B2 * | 11/2016 | Ishii | H04L 27/2601 |
| 9,621,293 B2 * | 4/2017 | Hazani | H04W 74/04 |
| 9,686,007 B2 * | 6/2017 | Braz | H04B 7/15542 |
| 9,806,797 B2 * | 10/2017 | Berlin | H04B 7/2606 |
| 9,813,164 B2 * | 11/2017 | Berlin | H04B 10/808 |
| 9,924,369 B2 * | 3/2018 | Shekalim | H04W 16/14 |
| 9,979,443 B2 * | 5/2018 | Schmid | H04B 7/0413 |
| 2006/0106490 A1 * | 5/2006 | Howell | G07F 9/006 |
| | | | 700/233 |
| 2008/0268833 A1 * | 10/2008 | Huang | H04B 7/024 |
| | | | 455/425 |
| 2013/0114963 A1 | 5/2013 | Stapleton et al. | |
| 2013/0322415 A1 * | 12/2013 | Chamarti | G01S 5/0231 |
| | | | 370/338 |
| 2014/0037292 A1 | 2/2014 | Stapleton et al. | |
| 2014/0233442 A1 * | 8/2014 | Atias | H04W 52/0206 |
| | | | 370/311 |
| 2014/0362763 A1 | 12/2014 | Hu et al. | |
| 2015/0031316 A1 * | 1/2015 | Berlin | H04W 72/0453 |
| | | | 455/84 |
| 2015/0256358 A1 | 9/2015 | Stapleton et al. | |
| 2016/0088522 A1 | 3/2016 | Lu et al. | |
| 2017/0093492 A1 * | 3/2017 | Mizrahi | H04B 10/2504 |
| 2017/0289817 A1 * | 10/2017 | Shekalim | H04W 16/14 |
| 2017/0318476 A1 * | 11/2017 | Kruh | H04W 16/18 |
| 2017/0318479 A1 | 11/2017 | Cotanis et al. | |

FOREIGN PATENT DOCUMENTS

| | | |
|---|---|---|
| WO | 2012064333 A1 | 5/2012 |
| WO | 2016156949 A1 | 10/2016 |

\* cited by examiner

DIRECT COMMUNICATIVE COUPLING OF A RADIO SOURCE TO A REMOTE UNIT FOR EXCHANGING COMMUNICATIONS SERVICES WITH A DISTRIBUTED COMMUNICATIONS SYSTEM (DCS)

CROSS-REFERENCE TO RELATED APPLICATION

This is a continuation of U.S. application Ser. No. 15/278,779, filed on Sep. 28, 2016, which claims the benefit of priority under 35 U.S.C. § 119 of U.S. Provisional App. No. 62/234,842, filed Sep. 30, 2015, the contents of which are incorporated herein by reference in their entireties.

BACKGROUND

The disclosure relates generally to distributed communications systems and, more particularly, to direct communicative coupling of a radio source, such as a base station, to a remote unit in a distributed communications system (DCS), such as a distributed antenna system (DAS), for exchanging communications services with the DCS.

Wireless customers are increasingly demanding digital data services, such as streaming video signals. At the same time, some wireless customers use their wireless communication devices in areas that are poorly serviced by conventional cellular networks, such as inside certain buildings or areas where there is little cellular coverage. One response to the intersection of these two concerns has been the use of DASs. DASs include remote antenna units (RAUs) configured to receive and transmit communications signals to client devices within the antenna range of the RAUs. DASs can be particularly useful when deployed inside buildings or other indoor environments where the wireless communication devices may not otherwise be able to effectively receive radio-frequency (RF) signals from a source.

In this regard, FIG. 1 illustrates distribution of communications services to remote coverage areas 100(1)-100(N) of a DAS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) are created by and centered on RAUs 104(1)-104(N) connected to a centralized equipment (HEE) 106 (e.g., a head-end controller, a head-end unit, or a central unit). The centralized equipment 106 may be communicatively coupled to a signal source 108, for example, a base transceiver station (BTS) or a baseband unit (BBU). In this regard, the centralized equipment 106 receives downlink communications signals 110D from the signal source 108 to be distributed to the RAUs 104(1)-104(N). The RAUs 104(1)-104(N) are configured to receive the downlink communications signals 110D from the centralized equipment 106 over a communications medium 112 to be distributed to the respective remote coverage areas 100(1)-100(N) of the RAUs 104(1)-104(N). In a non-limiting example, the communications medium 112 may be a wired communications medium, a wireless communications medium, or an optical fiber-based communications medium. Each of the RAUs 104(1)-104(N) may include an RF transmitter/receiver (not shown) and a respective antenna 114(1)-114(N) operably connected to the RF transmitter/receiver to wirelessly distribute the communications services to client devices 116 within the respective remote coverage areas 100(1)-100(N). The RAUs 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by amount of RF power transmitted by the respective RAUs 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the RAUs 104(1)-104(N) mainly determine the size of the respective remote coverage areas 100(1)-100(N).

No admission is made that any reference cited herein constitutes prior art. Applicant expressly reserves the right to challenge the accuracy and pertinency of any cited documents.

SUMMARY

Embodiments of the disclosure relate to direct communicative coupling of a radio source(s) to a remote unit for exchange of communications services with a distributed communications system (DCS). For example, the radio source may be a cellular base station as a non-limiting example. The remote unit may include a remote antenna unit that is provided in a distributed antenna system (DAS) as one type of DCS, as other examples. In this manner, the remote unit can facilitate distribution of communications services from a radio source into the DCS at locations other than at a centralized location in the DCS, such as at a central unit or head-end equipment. For example, it may not be convenient or possible to locate a radio source in close proximity to a centralized location in the DCS. Also, directly communicatively coupling a radio source to a remote unit in a DCS may be advantageous if a central unit in the DCS does not have additional available interfacing for interfacing additional radio sources to the DCS. For example, the DCS may already have a number of other radio sources connected to the central unit. Various DCS configurations are possible that include a remote unit supporting the directly communicatively coupling to a radio source(s) for distributing communications services. As one non-limiting example, the radio source(s) may be wired or wirelessly communicatively coupled to the remote unit. As another non-limiting example, a DCS architecture may be configured in a star configuration, where communications signals exchanged by the remote unit directly coupled to the radio source and other remote units in the DCS are routed through a central unit or other head-end equipment. In another non-limiting example, the DCS architecture may be configured in a daisy chain configuration, where communications signals exchanged by the remote unit directly coupled to the radio source and other remote units in the DCS are routed directly between the remote units.

An additional embodiment of the disclosure relates to a DCS. The DCS comprises a central unit configured to receive downlink communications signals from at least one radio source and distribute the downlink communications signals to be received by a plurality of remote units, and receive uplink communications signals received by the plurality of remote units. Each of the plurality of remote units is configured to receive the downlink communications signals and distribute the downlink communications signals to at least one client device, and receive uplink communications signals from the at least one client device and distribute the received uplink communications signals to be received by the central unit. One or more radio source remote units among the plurality of remote units are each configured to receive remote downlink communications signals from at least one remote radio source directly communicatively coupled to the one or more radio source remote units. The one or more radio source remote units among the plurality of remote units are also each configured to distribute the remote downlink communications signals to at least one client device. The one or more radio source remote units among the plurality of remote units are also each configured to distribute the remote downlink communications signals to be received by at least one other remote unit among the plurality of remote units. The one or more radio source remote units among the plurality of remote units are also each configured to distribute the uplink communications signals received from the at least one client device to the at least one remote radio source. The one or more radio source remote units among the plurality of remote units are also each configured to distribute the uplink communications signals received by at least one other remote unit among the plurality of remote units to the at least one remote radio source.

An additional embodiment of the disclosure relates to a method of exchanging communications signals in a DCS with a remote radio source directly communicatively coupled to a remote unit in the DCS. The method comprises receiving downlink communications signals in a central unit from at least one radio source communicatively coupled to the central unit. The method also comprises distributing the downlink communications signals from the central unit to be received by a plurality of remote units. The method also comprises receiving uplink communications signals in the central unit received by the plurality of remote units. The method also comprises receiving the downlink communications signals in one or more of the plurality of remote units. The method also comprises distributing the downlink communications signals from one or more of the plurality of remote units to at least one client device. The method also comprises receiving uplink communications signals from the at least one client device. The method also comprises distributing the received uplink communications signals from one or more of the plurality of remote units to be received by the central unit. The method also comprises receiving remote downlink communications signals in a radio source remote unit among the plurality of remote units, from at least one remote radio source directly communicatively coupled to the radio source remote unit. The method also comprises distributing the remote downlink communications signals from the radio source remote unit to at least one client device. The method also comprises distributing the remote downlink communications signals from the radio source remote unit to be received by at least one other remote unit among the plurality of remote units. The method also comprises distributing the uplink communications signals received from the at least one client device to the at least one remote radio source. The method also comprises distributing the uplink communications signals received by the at least one remote unit among the plurality of remote units to the at least one remote radio source.

An additional embodiment of the disclosure relates to a remote unit for exchanging communications signals in a DCS. The remote unit comprises an input interface configured to receive downlink communications signals in a DCS. The remote unit also comprises a client device output interface configured to distribute the received downlink communications signals to at least one client device. The remote unit also comprises a client device input interface configured to receive uplink communications signals from the at least one client device. The remote unit also comprises an output interface configured to distribute the received uplink communications signals to be received by a central unit. The remote unit also comprises a remote input interface configured to receive remote downlink communications signals from one or more radio source remote units directly communicatively coupled to the remote unit. The input interface is configured to distribute the remote downlink communications signals to be received by at least one other remote unit among a plurality of remote units. The remote unit also comprises a remote output interface configured to distribute the uplink communications signals received from the at least one client device to at least one remote radio source. The remote output interface is configured to distribute the uplink communications signals received by the at least one other remote unit among the plurality of remote units to the at least one remote radio source.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to direct communicative coupling of a radio source(s) to a remote unit for exchanging communications services with a distributed communications system (DCS). For example, the radio source may be a cellular base station as a non-limiting example. The remote unit may include a remote antenna unit that is provided in a distributed antenna system (DAS) as one type of DCS, as other examples. In this manner, the remote unit can facilitate distribution of communications services from a radio source into the DCS at locations other than at a centralized location in the DCS, such as at a central unit or head-end equipment. For example, it may not be convenient or possible to locate a radio source in close proximity to a centralized location in the DCS. Also, directly communicatively coupling a radio source to a remote unit in a DCS may be advantageous if a central unit in the DCS does not have additional available interfacing for interfacing additional radio sources to the DCS. For example, the DCS may already have a number of other radio sources connected to the central unit. Various DCS configurations are possible that include a remote unit supporting the directly communicatively coupling to a radio source(s) for distributing communications services. As one non-limiting example, the radio source(s) may be wired or wirelessly communicatively coupled to the remote unit. As another non-limiting example, the DCS may be configured in a star architecture, where communications signals exchanged by the remote unit directly coupled to the radio source and other remote units in the DCS are routed through a central unit or other head-end equipment. In another non-limiting example, the DCS may be configured in a daisy chain architecture, where communications signals exchanged by the remote unit directly coupled to the radio source and other remote units in the DCS are routed directly between the remote units.

Figure 1:
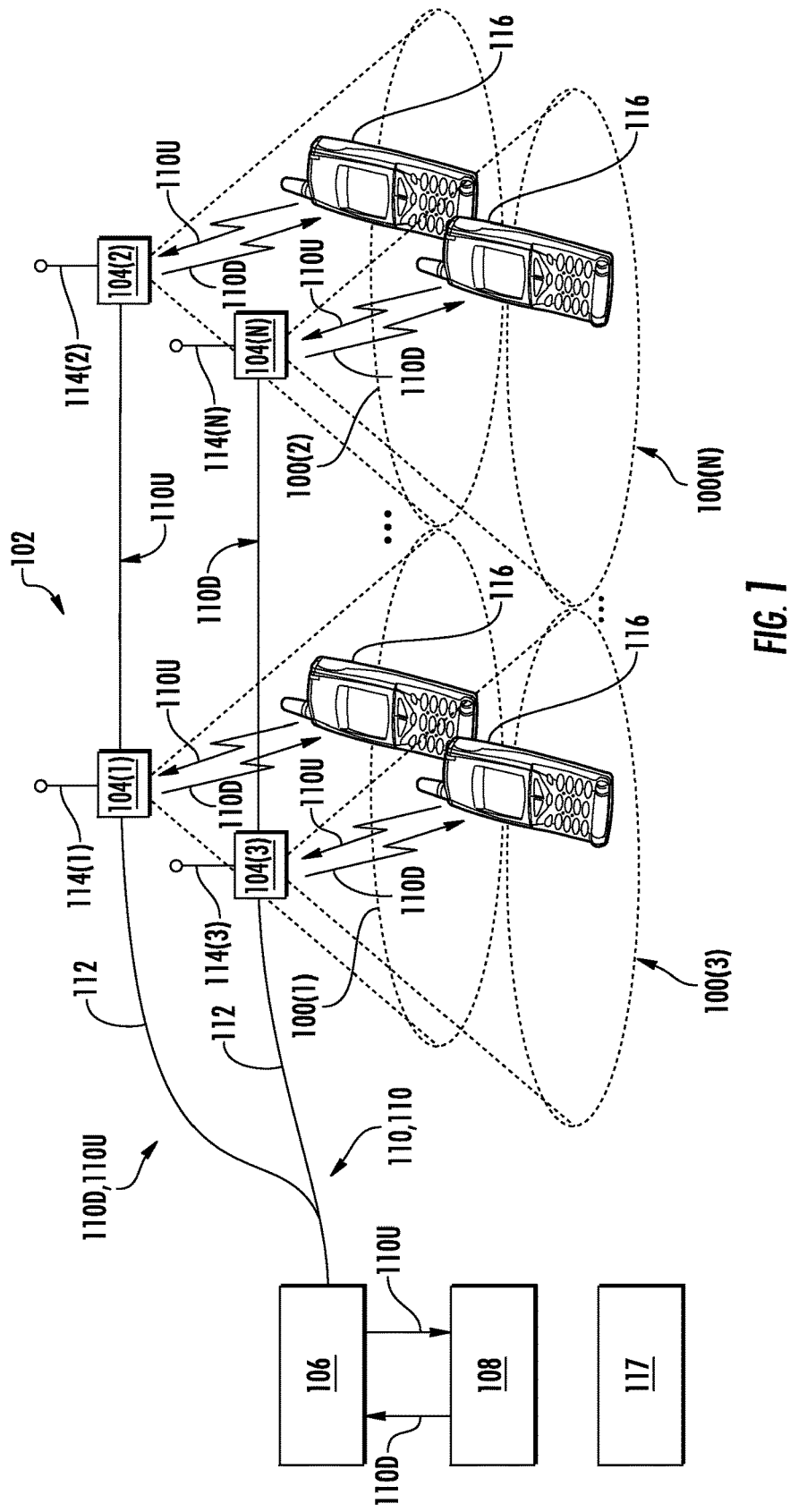
FIG. 1 is a schematic diagram of an exemplary distributed communications system (DCS)
Figure 2:
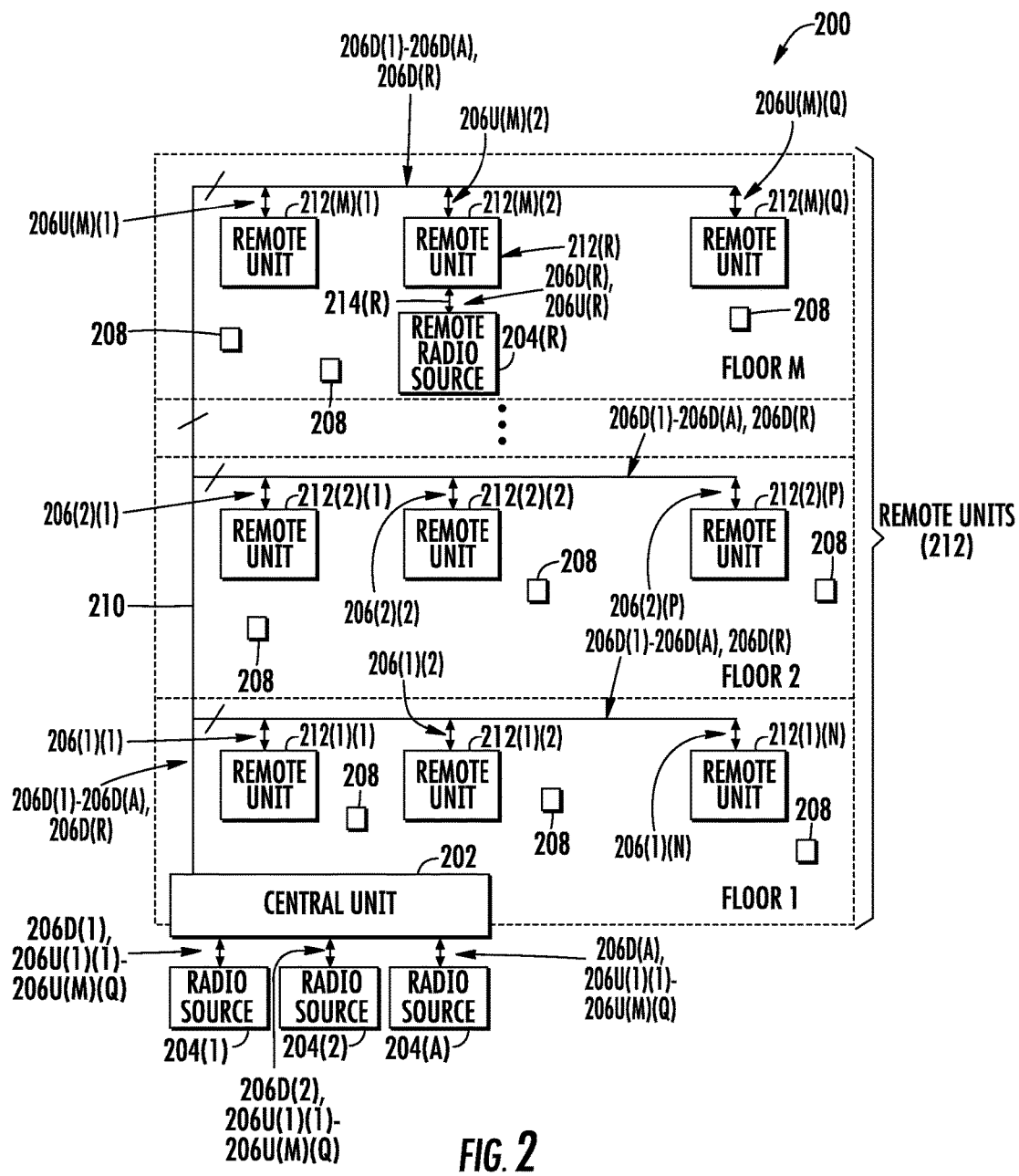
FIG. 2 is a schematic diagram of an exemplary DCS that includes a central unit configured to distribute communications signals to a plurality of remote units, wherein at least one remote unit is also a radio source remote unit directly communicatively coupled to a remote radio source for exchanging communications signals between the remote radio source and other remote units in the DCS.

In this regard, FIG. 2 is a schematic diagram of an exemplary DCS 200. The DCS 200 includes a central unit 202 that is communicatively coupled to one or more radio sources 204(1)-204(A). The central unit 202 is configured to receive downlink communications signals 206D(1)-206D(A) from the respective radio sources 204(1)-204(A) and distribute the downlink communications signals 206D(1)-206D(A) over a communications media 210 to one or more remote units 212. For example, a radio source 204(1)-204(A) could be any type of communications signal source that is configured to distribute communications signals. For example, a radio source 204(1)-204(A) could be a cellular base station. In this example, the radio source 204(1)-204(A) would be configured to distribute downlink cellular communications signals as the downlink communications signals 206D(1)-206D(A) to other remote units 212, and receive uplink cellular communications signals as the uplink communications signals 206U from other remote units 212. The remote radio source 204 could also be a baseband unit for example, that distributes downlink communications signals 206D in baseband frequency(ies) in the DCS 200.

In this example, the DCS 200 is provided over multiple floors 1-M in this example. Each floor 1-M includes one or more remote units 212. In this example, floor 1 has 'N' remote units 212(1)(1)-212(1)(N) in this example. Floor 2 has 'P' remote units 212(2)(1)-212(2)(P) in this example. Floor 'M' has 'Q' remote units 212(M)(1)-212(M)(Q) in this example. The remote units 212(1)(1)-212(1)(N) on floor 1 are configured to receive uplink communications signals 206U(2)(1)-206U(2)(N) from client devices 208. The remote units 212(2)(1)-212(2)(P) on floor 2 are configured to receive uplink communications signals 206U(2)(1)-206U(2)(P) from the client devices 208. The remote units 212(M)(1)-212(M)(Q) on floor M are configured to receive uplink communications signals 206U(M)(1)-206U(M)(Q) from the client devices 208. The remote units 212(1)(1)-212(1)(N), 212(2)(1)-212(2)(P), 212(M)(1)-212(M)(Q) on floors 1, 2, and M are configured to distribute their received uplink communications signals 206U(1)(1)-206U(1)(N), 206U(2)(1)-206U(2)(P), 206U(M)(1)-206U(M)(Q) over the communications media 210 to be distributed to the central unit 202.

The communications medium 210 can be any type of wired communications medium desired as an example, including without limitation, coaxial cable, optical fiber, and twisted pair wiring. Also, as will be discussed in more detail below, communications media 210 can include separate downlink and/or uplink communication medium for each remote unit 212(1)(1)-212(1)(N), 212U(2)(1)-212U(2)(P), 212(M)(1)-212(M)(Q) or common downlink and/or uplink communications medium in a point-to-multipoint arrangement. Alternatively, the communications media 210 can also include separate or common daisy-chained downlink and/or uplink communications medium between the central unit 202 and the remote unit 212(1)(1)-212(1)(N), 212(2)(1)-212(2)(P), 212(M)(1)-212(M)(Q).

With continuing reference to FIG. 2, the DCS 200 also includes a radio source remote unit 212(R). The radio source remote unit 212(R) is directly communicatively coupled via a direct communicative coupling 214(R) to a remote radio source 204(R) for exchanging downlink communications signals 206D(R) and uplink communications signals 206U(R) between the remote radio source 204(R) and other remote units 212 in the DCS 200. In this example, remote unit 212(M)(2) in floor M is the radio source remote unit 212(R). The direct communicative coupling 214(R) between the remote radio source 204(R) and the radio source remote unit 212(R) could be a direct or indirect physically connected coupling, such as electrical conducting wire or optical fiber as non-limiting examples. The direct communicative coupling 214(R) between the remote unit 212(M)(2) and the remote radio source 204(R) could also be a wireless coupling as a non-limiting example. Direct communicative coupling of the remote radio source 204(R) to the radio source remote unit 212(R) in the DCS 200 may be advantageous if, for example, the central unit 202 in the DCS 200 does not have additional available interfacing for interfacing additional radio sources. Or, it may be desired for other reasons to directly communicatively couple the remote radio source 204(R) to the remote unit 212(M)(2).

In this regard, with continuing reference to FIG. 2, in addition to being able to exchange the downlink and uplink communications signals 206D(1)-206D(A), 206U(M)(2) with the central unit 202, the radio source remote unit 212(R) is configured to receive remote downlink communications signals 206D(R) from the remote radio source 204(R) through the direct communicative coupling 214(R). The radio source remote unit 212(R) is configured to distribute the received remote downlink communications signals 206D(R) to a client device 208 communicatively coupled to the radio source remote unit 212(R). The radio source remote unit 212(R) is also configured to distribute the remote downlink communications signals 206D(R) to be received by at least one other remote unit 212 among the plurality of remote units 212(1)(1)-212(1)(N), 212(2)(1)-212(2)(P), 212(M)(1), 212(M)(3)-212(M)(Q) in the DCS 200. As will be discussed in more detail below with regard to one example in FIGS. 4A-4C, the radio source remote unit 212(R) can be configured to distribute the remote downlink communications signals 206D(R) directly to the central unit 202 to be distributed to other remote units 212 among the plurality of remote units 212(1)(1)-212(1)(N), 212(2)(1)-212(2)(P), 212(M)(1), 212(M)(3)-212(M)(Q) if the DCS 200 is provided in a star or point-to-multi-point configuration. As will also be discussed in more detail below with regard to another example in FIGS. 5A and 5B, the radio source remote unit 212(R) can be configured to distribute the remote downlink communications signals 206D(R) through other daisy-chained remote units 212 among the plurality of remote units 212(1)(1)-212(1)(N), 212(2)(1)-212(2)(P), 212(M)(1), 212(M)(3)-212(M)(Q) if the DCS 200 is provided in a daisy-chain configuration. The radio source remote unit 212(R) is also configured to distribute uplink communications signals 206U(M)(2) received from a client device 208 to the remote radio source 204(R).

With continuing reference to FIG. 2, the radio source remote unit 212(R) is also configured to distribute the received uplink communications signals 206U(1)(1)-206U(1)(N), 206U(2)(1)-206U(2)(P), 206U(M)(1)-206U(M)(Q) received by one or more of the other remote units 212(1)(1)-212(1)(N), 212(2)(1)-212(2)(P), 212(M)(1), 212(M)(3)-212(M)(Q) to the remote radio source 204(R). Again, as non-limiting examples, the uplink communications signals 206U(1)(1)-206U(1)(N), 206U(2)(1)-206U(2)(P), 206U(M)(1)-206U(M)(Q) may be received by the radio source remote unit 212(R) through the central unit 202 in a star configuration for the DCS 200, or directly from the other remote units 212(1)(1)-212(1)(N), 212(2)(1)-212(2)(P), 212(M)(1), 212(M)(3)-212(M)(Q) in a daisy-chain configuration for the DCS 200.

Just as for the radio sources 204(1)-204(A), the remote radio source 204(R) could be any type of radio source that is configured to distribute communications signals. For example, the remote radio source 204(R) could be a cellular base station. In this example, the remote radio source 204(R) would be configured to distribute downlink cellular communications signals as the remote downlink communications signals 206D(R) to the radio source remote unit 212(R) and the other remote units 212, and receive uplink cellular communication signals as the remote uplink communications signals 206U(R) from the radio source remote unit 212(R) and the other remote units 212. The remote radio source 204(R) could also be a baseband unit, for example, that distributes the remote downlink communications signals 206D(R) in baseband frequency(ies) in the DCS 200.

Figure 3:
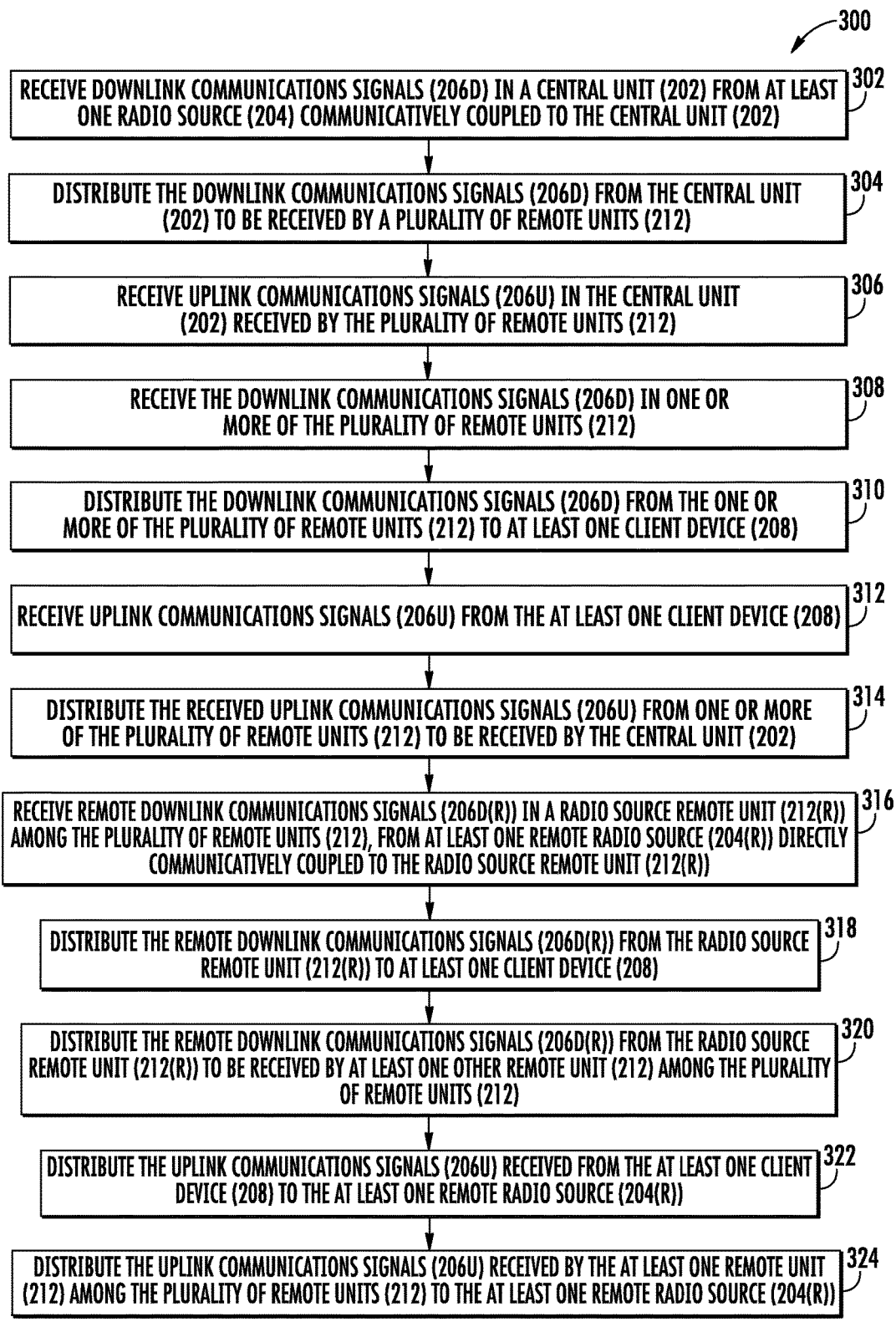
FIG. 3 is a flowchart illustrating an exemplary process of a radio source remote unit in the DCS in FIG. 2 directly communicatively coupled to a remote radio source, for exchanging communications signals between the remote radio source and the other remote units in the DCS.

FIG. 3 is a flowchart illustrating an exemplary process 300 of the radio source remote unit 212(R) in the DCS 200 in FIG. 2 directly communicatively coupled to the remote radio source 204(R), for distributing communications signals between the remote radio source 204(R) and the other remote units 212 in the DCS 200. In this regard, the central unit 202 receives downlink communications signals 206D(1)-206D(A) from at least one radio source 204(1)-204(A) communicatively coupled to the central unit 202 (block 302). The downlink communications signals 206D(1)-206D(A) are distributed from the central unit 202 to be received by a plurality of remote units 212 (block 304). The central unit 202 is also configured to receive uplink communications signals 206U(1)(1)-206U(1)(N), 206U(2)(1)-206U(2)(P), 206U(M)(1)-206U(M)(Q) received by the respective plurality of remote units 212(1)(1)-212(1)(N), 212(2)(1)-212(2)(P), 212(M)(1)-212(M)(Q) (block 306). The remote units 212(1)(1)-212(1)(N), 212(2)(1)-212(2)(P), 212(M)(1)-212(M)(Q) are configured to receive the downlink communications signals 206D(1)-206D(A) from the central unit 202 (block 308). The remote units 212(1)(1)-212(1)(N), 212(2)(1)-212(2)(P), 212(M)(1)-212(M)(Q) are configured to distribute the downlink communications signals 206D(1)-206D(A) to at least one client device 208 (block 310). The remote units 212(1)(1)-212(1)(N), 212(2)(1)-212(2)(P), 212(M)(1)-212(M)(Q) are also configured to receive the uplink communications signals 206U(1)(1)-206U(1)(N), 206U(2)(1)-206U(2)(P), 206U(M)(1)-206U(M)(Q) from the client devices 208 (block 312). The remote units 212(1)(1)-212(1)(N), 212(2)(1)-212(2)(P), 212(M)(1)-212(M)(Q) are configured to distribute the received uplink communications signals 206U(1)(1)-206U(1)(N), 206U(2)(1)-206U(2)(P), 206U(M)(1)-206U(M)(Q) from one or more of the plurality of remote units 212(1)(1)-212(1)(N), 212(2)(1)-212(2)(P), 212(M)(1)-212(M)(Q) to be received by the central unit 202 (block 314).

With continuing reference to FIG. 3, the radio source remote unit 212(R) among the remote units 212(1)(1)-212(1)(N), 212(2)(1)-212(2)(P), 212(M)(1)-212(M)(Q) is configured to receive remote downlink communications signals 206D(R) from at least one remote radio source 204(R) directly communicatively coupled to the radio source remote unit 212(R) (block 316). The radio source remote unit 212(R) is configured to distribute the remote downlink communications signals 206D(R) to at least one client device 208 (block 318). The radio source remote unit 212(R) is also configured to distribute the remote downlink communications signals 206D(R) to be received by at least one other remote unit 212 among the plurality of remote units 212(1)(1)-212(1)(N), 212(2)(1)-212(2)(P), 212(M)(1)-212(M)(Q) (block 320). The radio source remote unit 212(R) is also configured to distribute the uplink communications signals 206U(1)(1)-206U(1)(N), 206U(2)(1)-206U(2)(P), 206U(M)(1)-206U(M)(Q) to the at least one remote radio source 204(R) (block 322). The radio source remote unit 212(R) is also configured to distribute the uplink communications signals 206U(1)(1)-206U(1)(N), 206U(2)(1)-206U(2)(P), 206U(M)(1)-206U(M)(Q) received by at least one remote unit 212 among the plurality of remote units 212(1)(1)-212(1)(N), 212(2)(1)-212(2)(P), 212(M)(1)-212(M)(Q) to the at least one remote radio source 204(R) (block 324).

Figure 4A:
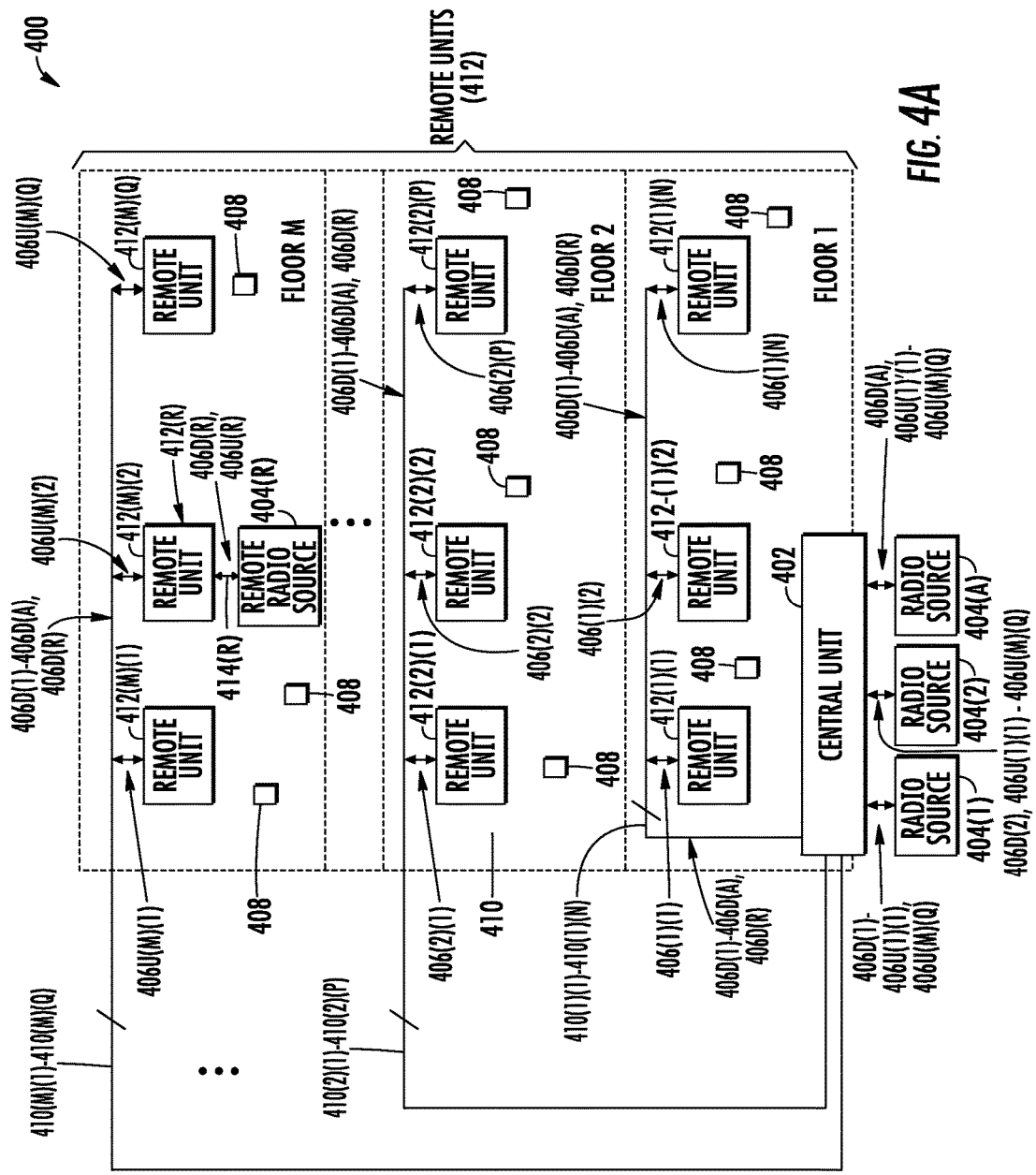
FIG. 4A is a schematic diagram of another exemplary DCS that includes a central unit configured to distribute communications signals with a plurality of remote units each directly communicatively coupled to the central unit in star configuration, wherein at least one remote unit in the DCS is a radio source remote unit directly communicatively coupled to a remote radio source for exchanging communications signals between the radio source remote unit and the central unit, to be distributed to other remote units in the DCS.

FIG. 4A is a schematic diagram of another exemplary DCS 400 that includes a central unit 402 configured to distribute communications signals with a plurality of remote units 412 each directly communicatively coupled to the central unit 402 in a star configuration. As discussed below, a remote unit 412 in the DCS 400 is a radio source remote unit 412(R) directly communicatively coupled to a remote radio source 404(R) for distributing communications signals between the radio source remote unit 412(R) and the central unit 402. In this regard, the central unit 402 is configured to distribute remote downlink communications signals 406D(R) received from the radio source remote unit 412(R) to the remote units 412 in the DCS 400. The central unit 402 is also configured to distribute uplink communications signals 406U received from remote units 412 that received such uplink communications signals 406U from client devices 408, to the remote radio source 404(R).

In this regard, with reference to FIG. 4A, the DCS 400 includes the central unit 402 that is communicatively coupled to one or more radio sources 404(1)-404(A). The central unit 402 is configured to receive downlink communications signals 406D(1)-406D(A) from the respective radio sources 404(1)-404(A) and distribute the downlink communications signals 406D(1)-406D(A) over individual communications media 410(1)(1)-410(1)(N), 410(2)(1)-410(2)(P), 410(M)(1)-410(M)(Q) coupled to respective remote units 412(1)(1)-412(1)(N), 412(2)(1)-412(2)(P), 412(M)(1)-412(M)(Q) provided over floors 1-M. For example, the radio source 404(1)-404(A) could be any type of communications signal source that is configured to distribute communications signals, including without limitation, a cellular base station and a baseband unit.

In this example, the DCS 400 is provided over multiple floors 1-M in this example. Each floor 1-M includes one or more remote units 412. In this example, floor 1 has 'N' remote units 412(1)(1)-412(1)(N) in this example. Floor 2 has 'P' remote units 412(2)(1)-412(2)(P) in this example. Floor 'M' has 'Q' remote units 412(M)(1)-412(M)(Q) in this example. The remote units 412(1)(1)-412(1)(N) on floor 1 are configured to receive uplink communications signals 406U(1)(1)-406U(1)(N) from client devices 408. The remote units 412(2)(1)-412(2)(P) on floor 2 are configured to receive uplink communications signals 406U(2)(1)-406U(2)(P) from the client devices 408. The remote units 412(M)(1)-412(M)(Q) on floor M are configured to receive uplink communications signals 406U(M)(1)-406U(M)(Q) from the client devices 408. The remote units 412(1)(1)-412(1)(N), 412(2)(1)-412(2)(P), 412(M)(1)-412(M)(Q) are configured to distribute their received uplink communications signals 412U(1)(1)-412U(1)(N), 412U(2)(1)-412U(2)(P), 412U(M)(1)-412U(M)(Q) over individual communications media 410(1)(1)-410(1)(N), 410(2)(1)-410(2)(P), 410(M)(1)-410(M)(Q) to the central unit 402 in a star or point-to-multipoint configuration.

With continuing reference to FIG. 4A, the DCS 400 also includes a radio source remote unit 412(R). The radio source remote unit 412(R) is directly communicatively coupled via a direct communicative coupling 414(R) to a remote radio source 404(R) for distributing downlink communications signals 406D(R) and uplink communications signals 406U(R) between the remote radio source 404(R) and other remote units 412 in the DCS 400. In this example, remote unit 412(M)(2) in floor M is the radio source remote unit 412(R). Just as for the radio sources 404(1)-404(A), the remote radio source 404(R) could be any type of radio source that is configured to distribute communications signals. For example, the remote radio source 404(R) could be a cellular base station. The direct communicative coupling 414(R) between the remote radio source 404(R) and the radio source remote unit 412(R) could be a direct or indirect physically connected coupling, such as electrical conducting wire or optical fiber as non-limiting examples. The direct communicative coupling 414(R) between the remote radio source 404(R) and the radio source remote unit 412(R) could also be a wireless coupling as a non-limiting example.

In addition to being able to exchange the downlink and uplink communications signals 406D(1)-406D(A), 406U(M)(2) with the central unit 402, the radio source remote unit 412(R) is configured to receive remote downlink communications signals 406D(R) from the remote radio source 404(R) through the direct communicative coupling 414(R). The radio source remote unit 412(R) is configured to distribute the received remote downlink communications signals 406D(R) to a client device 408 communicatively coupled to the radio source remote unit 412(R). The radio source remote unit 412(R) is also configured to distribute the remote downlink communications signals 406D(R) directly to the central unit 402 to then be further distributed to at least one other remote unit 412 among the plurality of remote units 412(1)(1)-412(1)(N), 412(2)(1)-412(2)(P), 412(M)(1), 412(M)(3)-412(M)(Q) in the DCS 400. The radio source remote unit 412(R) is also configured to distribute uplink communications signals 406U(M)(2) received from a client device 408 to the remote radio source 404(R).

With continuing reference to FIG. 4A, the radio source remote unit 412(R) is also configured to distribute the received uplink communications signals 406U(1)(1)-406U(1)(N), 406U(2)(1)-406U(2)(P), 406U(M)(1)-406U(M)(Q) received by one or more of the other remote units 412(1)(1)-412(1)(N), 412(2)(1)-412(2)(P), 412(M)(1), 412(M)(3)-412(M)(Q) to the remote radio source 404(R). In this example, the uplink communications signals 406U(1)(1)-406U(1)(N), 406U(2)(1)-406U(2)(P), 406U(M)(1)-406U(M)(Q) are received by the radio source remote unit 412(R) through the central unit 402 in a star configuration.

Figure 4B:
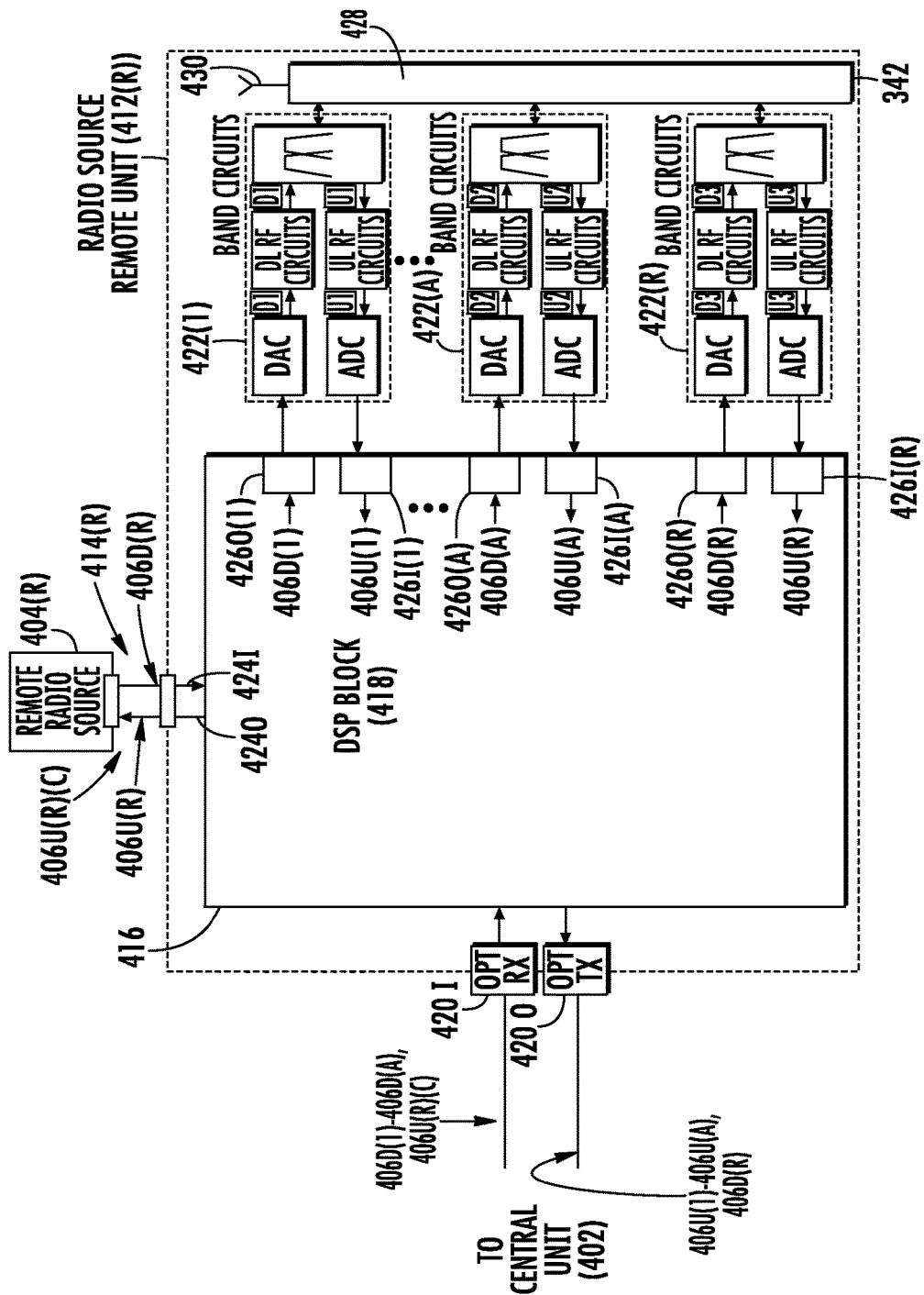
FIG. 4B is a schematic diagram of an exemplary radio source remote unit that can be provided in the DCS in FIG. 4A, wherein the radio source remote unit supports direct communicative coupling to a remote radio source and communicative coupling to the central unit in the DCS in FIG. 4A, for exchanging communications signals between the radio source remote unit and the central unit, to be distributed to other remote units in the DCS.

FIG. 4B is a schematic diagram of an exemplary radio source remote unit 412(R) in the DCS 400 in FIG. 4A. As discussed above, the radio source remote unit 412(R) supports direct communicative coupling to the remote radio source 404(R) and a communicative coupling to the central unit 402 in the DCS 400 in FIG. 4A, for distributing communications signals. In this regard, the radio source remote unit 412(R) in this example includes a processing circuit 416 in the form of digital signal processor (DSP) block 418 in this example. The DSP block 418 is configured to receive and distribute communications signals between various interfaces to support distribution of communications signals to and from the central unit 402 and to and from the directly coupled remote radio source 404(R). It should be noted that the remote radio source 404(R) and the radio sources 404(1)-404(A) may generate more than a single channel. However for simplifying the explanation, it is assumed that the remote radio source 404(R) and the radio sources 404(1)-404(A) provide a service in a single channel. In this regard, the radio source remote unit 412(R) includes an input interface in the form of an input central input interface 420I and an output interface in the form of a central output interface 420O for distributing communications signals to and from the central unit 402. In this example, the central input interface 420I is an optical interface and is configured to receive the downlink communications signals 406D(1)-406D(A) as optical downlink communications signals. As discussed below, the DSP block 418 distributes the downlink communications signals 406D(1)-406D(A) to respective band circuits 422(1)-422(A) to be distributed wirelessly to client devices 408. Also in this example, because the radio source remote unit 412(R) is directly communicatively coupled to the remote radio source 404(R), the DSP block 418 is also configured to receive combined remote uplink communications signals 406U(R)(C) through the central input interface 420I to be distributed to the remote radio source 404(R). This is because the remote downlink communications signals 406D(R) from the remote radio source 404(R) are distributed to other remote units 412 via the central unit 402. In this regard, the DSP block 418 can distribute the combined remote uplink communications signal 406U(R)(C) over the central input interface 420I to the remote radio source 404(R).

With continuing reference to FIG. 4B, the DSP block 418 is also configured to receive the uplink communications signals 406U(1)-406U(A) from the band circuits 422(1)-422(A) from client devices and distribute them over the central output interface 420O to the central unit 402. Because the radio source remote unit 412(R) is directly communicatively coupled to the remote radio source 404(R), the DSP block 418 is also configured to distribute received remote downlink communications signals 406D(R) from the remote radio source 404(R) to be distributed over the central output interface 420O to be distributed to the central unit 402.

With continuing reference to FIG. 4B, the DSP block 418 also includes a remote input interface 424I and a remote output interface 424O. The DSP block 418 is configured to receive the remote downlink communication signals 406D(R) through the remote output interface 424O from the remote radio source 404(R). As discussed above, the DSP block 418 of the radio source remote unit 412(R) is directly communicatively coupled through the direct communicative coupling 414(R) to the remote radio source 404(R). As also discussed above, the DSP block 418 is configured to distribute the received remote downlink communication signals 406D(R) to the band circuit 422(R) to be distributed to a client device 408 of the radio source remote unit 412(R). As discussed above, the DSP block 418 is also configured to distribute the received remote downlink communication signals 406D(R) to the central output interface 420O to be distributed to the central unit 402, to be distributed to other remote units 412.

With continuing reference to FIG. 4B, the DSP block 418 is also configured to distribute received remote uplink communications signals 406U(R) through the remote input interface 424I to the remote radio source 404(R). As discussed above, the DSP block 418 of the radio source remote unit 412(R) is configured to receive the remote uplink communication signals 406U(R) from the band circuit 422(R) from a client device and/or from the central unit 402 through the central input interface 420I from client devices communicatively coupled to other remote units 412 to which the remote downlink communication signals 406D(R) were distributed.

With continuing reference to FIG. 4B, the DSP block 418 also includes client device output interfaces 426O(1)-426O(A), 426O(R) and client device input interfaces 426I(1)-426I(A), 426I(R). The DSP block 418 is configured to distribute the downlink communications signals 406D(1)-406D(A) received through the central input interface 420I to the respective client device output interfaces 426O(1)-426O(A) to be distributed to respective client devices. In this regard, the client device output interfaces 426O(1)-426O(A) are coupled to respective band circuits 422(1)-422(A) to process the received downlink communications signals 406D(1)-406D(A) before being wirelessly transmitted to client devices. Also, the DSP block 418 is configured to distribute the remote downlink communications signals 406D(R) received through the remote input interface 424I from the remote radio source 404(R) to a client device output interface 426O(R) to be distributed to respective client devices. In this regard, the client device output interfaces 426O(1)-426O(A), 426O(R) are coupled to respective band circuits 422(1)-422(A), 422(R) to process the received downlink communications signals 406D(1)-406D(A), 406D(R) before being wirelessly transmitted to client devices. For example, each band circuit 422(1)-422(A), 422(R) may include a digital-to-analog converter (DAC) coupled to a respective client device output interface 426O(1)-426O(A), 426O(R) as shown in FIG. 4B, to convert the received downlink communications signals 406D(1)-406D(A), 406D(R) from a digital format to an analog format. Each band circuit 422(1)-422(A), 422(R) may also include downlink RF circuits, as shown in FIG. 4B, to process (e.g., filter) the received downlink communications signals 406D(1)-406D(A), 406D(R) into different radio bands. The DSP block 418 may have also filtered the downlink communications signals 406D(1)-406D(A), 406D(R) before being distributed to the different client device output interfaces 426O(1)-426O(A), 426O(R). The processed downlink communications signals 406D(1)-406D(A), 406D(R) can then be wirelessly transmitted through wireless interface 428 to one or more antennas 430 to be wirelessly transmitted.

With continuing reference to FIG. 4B, the DSP block 418 is also configured to receive uplink communications signals 406U(1)-406U(A) and remote uplink communications signals 406U(R) from client devices through respective client device input interfaces 426I(1)-426I(A), 426I(R). In this regard, the antenna 430 is configured to wirelessly receive the uplink communications signals 406U(1)-406U(A) and remote uplink communications signals 406U(R) and provide such signals to the respective band circuits 422(1)-422(A), 422(R) via the wireless interface 428. The received uplink communications signals 406U(1)-406U(A) and remote uplink communications signals 406U(R) are provided to respective uplink (UL) RF circuits in the band circuits 422(1)-422(A), 422(R) for processing (e.g., filtering). The received uplink communications signals 406U(1)-406U(A) and remote uplink communications signals 406U(R) may also be provided to respective analog-to-digital converters (ADCs) to convert the uplink communications signals 406U(1)-406U(A) and remote uplink communications signals 406U(R) from an analog to a digital format, if for example, the processing circuit 416 is configured to process signals in a digital format, as is the case in this example with the DSP block 418. The received uplink communications signals 406U(1)-406U(A) and remote uplink communications signals 406U(R) are then provided by the respective band circuits 422(1)-422(A), 422(R) to respective client device input interfaces 426I(1)-426I(A), 426(R) to be provided to the processing circuit 416. As previously discussed, the DSP block 418 is configured to route or distribute the received uplink communications signals 406U(1)-406U(A) to the central unit 402 over the central output interface 420O. The DSP block 418 is configured to route or distribute the received remote uplink communications signals 406U(R) to the remote output interface 424O to be provided to the directly coupled remote radio source 404(R).

Figure 4C:
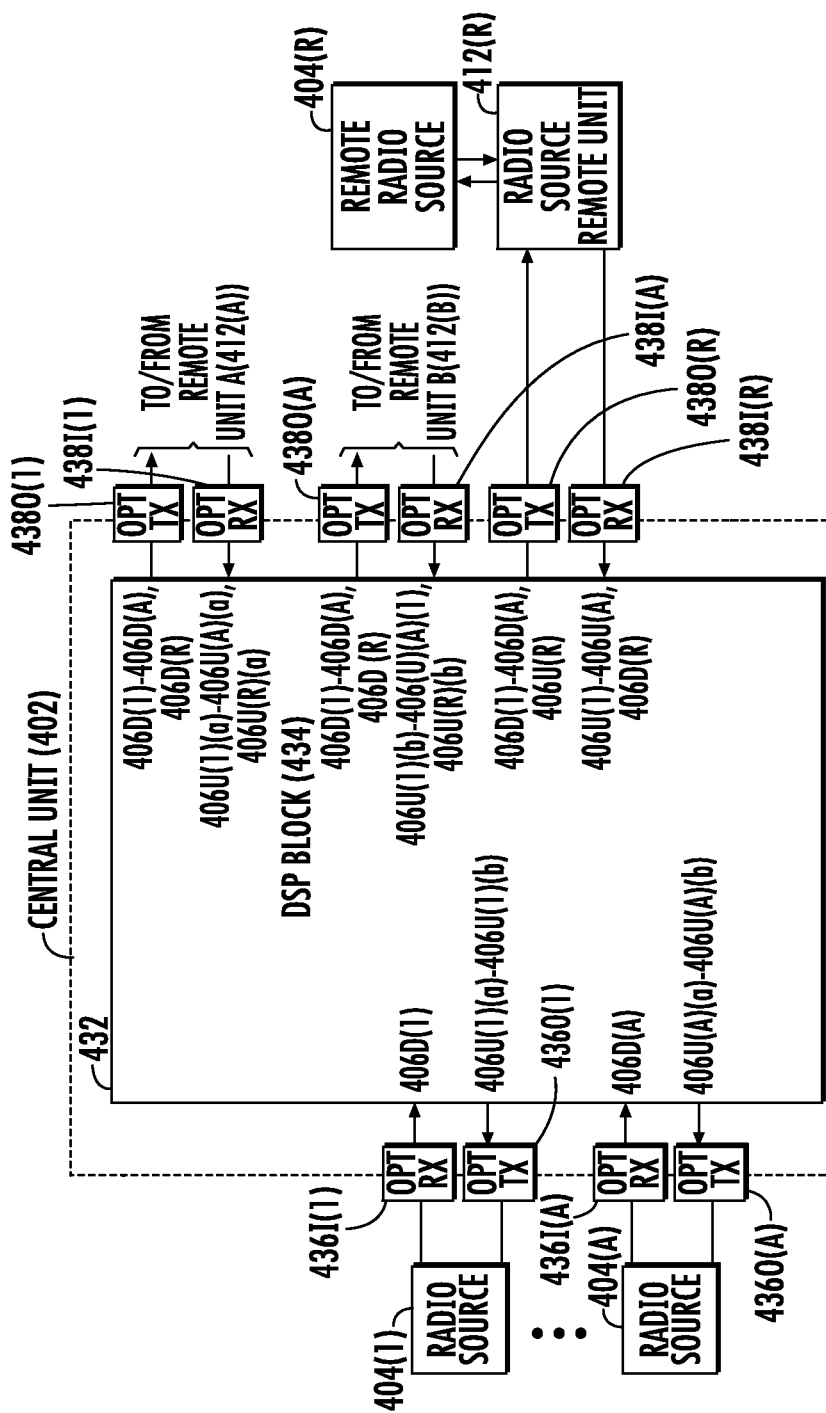
FIG. 4C is a schematic diagram of an exemplary central unit that can be provided in the DCS in FIG. 4A, wherein the central unit supports distributing communications signals received from a remote radio source directly communicatively coupled to a radio source remote unit which is communicatively coupled to the central unit, to other remote units in the DCS.

FIG. 4C is a schematic diagram of the central unit 402 that can be provided in the DCS 400 in FIG. 4A, to support exchanging communications signals with the remote radio source 404(R) directly communicatively coupled to the radio source remote unit 412(R). As shown in FIG. 4C, the central unit 402 includes a processing circuit 432. The processing circuit 432 may be a DSP block 434 as an example to digitally process the communication signals. For example, the radio sources 404(1)-404(A) may be configured to provide the downlink communications signals 406D(1)-406D(A) over respective input interfaces 436I(1)-436I(A) to the DSP block 434 in a digital format, including but not limited to digital baseband. The input interfaces 436I(1)-436I(A) may be optical interfaces to receive the downlink communications signals 406D(1)-406D(A) from the radio sources 404(1)-404(A) as optical downlink communications signals. The processing circuit 432 is also configured to provide the uplink communications signals 406U(1)(a)-406U(1)(b)-406U(A)(a)-406U(A)(b) over respective output interfaces 436O(1)-436O(A), which may also be optical interfaces.

With continuing reference to FIG. 4C, the processing circuit 432 is configured to process the received downlink communications signals 406D(1)-406D(A) and route the downlink communications signals 406D(1)-406D(A) to different remote units 412. In this example, the downlink communications signals 406D(1)-406D(A) are routed to groups of remote units 412, which are labeled remote unit grouping 412(A) and remote unit grouping 412(B) for exemplary purposes. In this regard, the processing circuit 432 routes the downlink communications signals 406D(1)-406D(A) over a remote unit output interface 438O(1) to remote unit grouping 412(A). The remote unit output interface 438O(1) may be an optical interface. The processing circuit 432 also routes the downlink communications signals 406D(1)-406D(A) over a remote unit output interface 438O(A) to remote unit grouping 412(B). The remote unit output interface 438O(A) may also be an optical interface. The processing circuit 432 also routes the downlink communications signals 406D(1)-406D(A) over a remote unit output interface 438O(R) to radio source remote unit 412(R). The remote unit output interface 438O(R) may also be an optical interface. The processing circuit 432 also routes the received remote downlink communications signals 406D(R) received on a remote uplink input interface 438I(R) to the remote unit output interfaces 438O(1)-438O(A) to be distributed to remote unit groupings 412(A), 412(B).

With continuing reference to FIG. 4C, the processing circuit 432 is also configured to receive uplink communications signals 406U(1)(a)-406U(A)(a)-40406U(1)(b)-406U(A)(b) over respective remote uplink input interfaces 438I(1)-438I(A) from the remote unit groupings 412(A), 412(B) to be distributed to the radio sources 404(1)-404(A) over the respective output interfaces 436O(1)-436O(A). 'a' and 'b' in the uplink communications signals 406U(1)(a)-406U(A)(a)-40406U(1)(b)-406U(A)(b) represent different services 'a' and 'b' from the respective remote unit groupings 412(A), 412(B). The processing circuit 432 is also configured to receive remote uplink communications signals 406U(R) over remote uplink input interface 438I(R) from the radio source remote unit 412(R) to be distributed to the other remote unit groupings 412(A), 412(B) over the respective remote unit output interfaces 438O(1)-438O(A). The processing circuit 432 is also configured to receive remote uplink communications signals 406U(R) over remote uplink input interfaces 438I(1)-438I(A) from the remote unit groupings 412(A), 412(B) to be distributed to the remote radio source 404(R) over the remote output interface 436O(R).

In this example, based on the grouping of remote unit groupings 412(A) and 412(B), the processing circuit 432 is configured to receive uplink communications signals 406U(1)(a)-406U(A)(a) and remote uplink communications signals 406U(R)(a) for remote unit grouping 412(A) on the remote uplink input interface 438I(1). The processing circuit 432 is configured to receive uplink communications signals 406U(1)(b)-406U(A)(b) and remote uplink communications signals 406U(R)(b) from remote unit grouping 412(B) on the remote uplink input interface 438I(A). Uplink communications signals 406U(1)(a)-406U(A)(a) and 406U(1)(b)-406U(A)(b) from remote unit groupings 412(A), 412(B) can be combined in the processing circuit 432 to be provided as uplink communications signals 406U(1)-406U(A). Remote uplink communications signals 406U(R)(a) and 406U(R)(b) from remote unit groupings 412(A), 412(B) can be combined in the processing circuit 432 to be provided as remote uplink communications signals 406U(R).

Figure 5A:
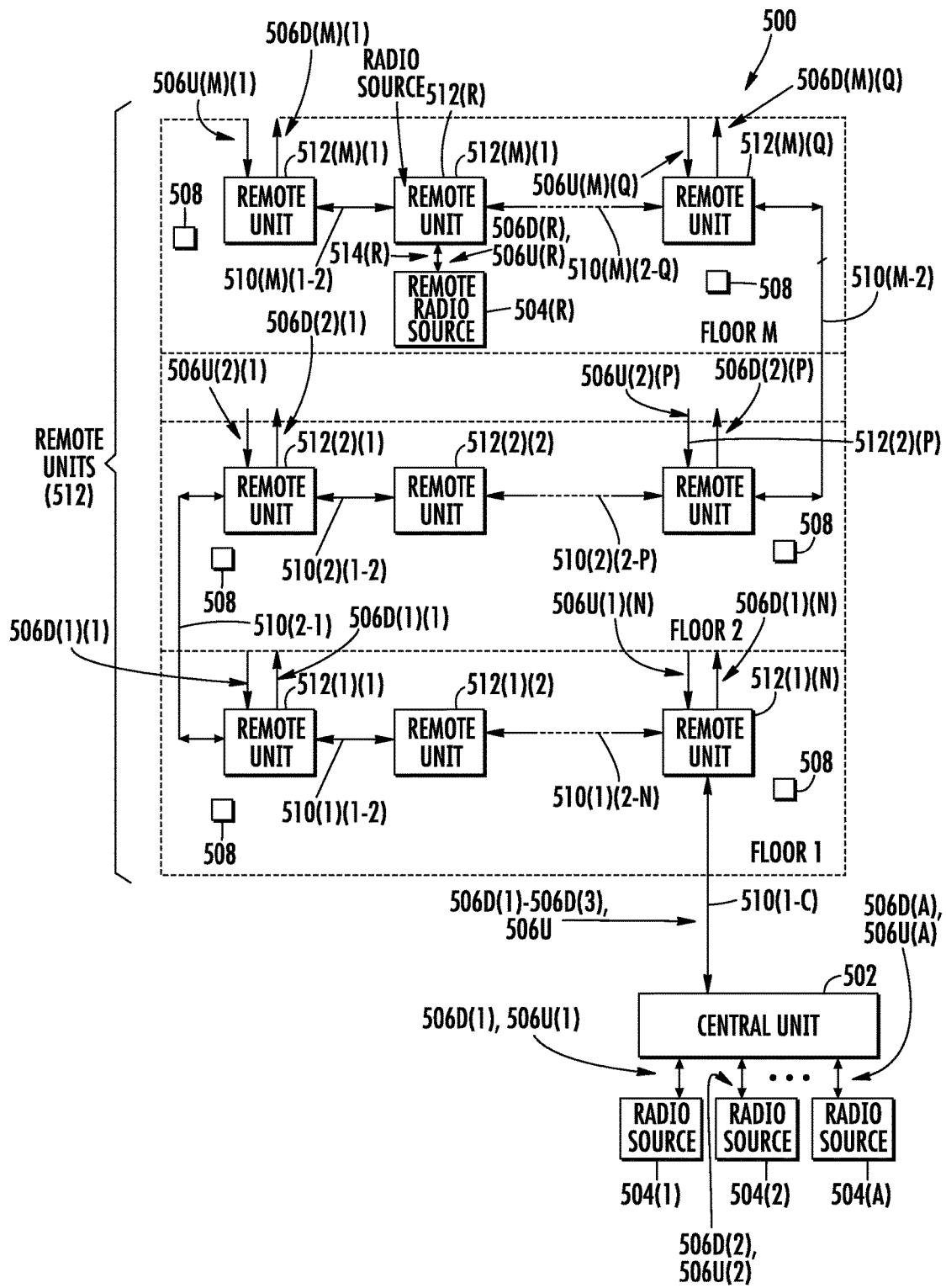
FIG. 5A is a schematic diagram of another exemplary DCS that includes a central unit configured to distribute communications signals with a plurality of remote units communicatively coupled together in a daisy-chain configuration, wherein at least one remote unit in the DCS is a radio source remote unit directly communicatively coupled to a remote radio source for distributing communications signals between the remote radio source and other daisy-chained remote units in the DCS.

FIG. 5A is a schematic diagram of another exemplary DCS 500 that includes a central unit 502 configured to distribute communications signals with a plurality of remote units 512 communicatively coupled in a daisy-chain configuration. As discussed below, a remote unit 512 in the DCS 500 is also a radio source remote unit 512(R) directly communicatively coupled to a remote radio source 504(R). In this manner, the DCS 500 supports distribution of communications signals between the remote radio source 504(R) to the other remote units 512, through the radio source remote unit 512(R) being communicatively coupled to the other remote units 512 in a daisy-chained arrangement.

In this regard, with reference to FIG. 5A, the DCS 500 includes the central unit 502 that is communicatively coupled to one or more radio sources 504(1)-504(A). The central unit 502 is configured to receive downlink communications signals 506D(1)-506D(A) from the respective radio sources 504(1)-504(A). For example, the radio source 504(1)-504(A) could be any type of communications signal source that is configured to distribute communications signals, including without limitation, a cellular base station and a baseband unit. In this example, the DCS 500 is provided over multiple floors 1-M in this example. The central unit 502 is configured to distribute the downlink communications signals 506D(1)-506D(A) to respective daisy-chained remote units 512(1)(1)-512(1)(N), 512(2)(1)-512(2)(P), 512(M)(1)-512(M)(Q) provided over floors 1-M. Each floor 1-M includes one or more remote units 512. In this example, floor 1 has 'N' remote units 512(1)(1)-512(1)(N) in this example that are daisy-chained together. Communications media 510(1)(1-2) communicatively couples remote unit 512(1)(1) to 512(1)(2) in a daisy-chain arrangement. Communications media 510(1)(2-N) represents communicative coupling of remote units 512(1)(2) to 512(1)(N) in FIG. 5A in a daisy-chain arrangement. Note that additional communications media are provided if more remote units 512(1)( ) are provided on the floor 1. Floor 2 has 'P' remote units 512(2)(1)-512(2)(P) in this example. Communications media 510(2)(1-2) communicatively couples remote unit 512(2)(1) to 512(2)(2) in a daisy-chain arrangement. Communications media 510(2)(2-P) represents communicative coupling of remote units 512(2)(2) to 512(2)(P) in a daisy-chain arrangement. Floor 'M' has 'Q' remote units 512(M)(1)-512(M)(Q) in this example. Communications media 510(M)(1-2) communicatively couples remote unit 512(M)(1) to 512(M)(2) in a daisy-chain arrangement. Communications media 510(M)(2-Q) represents communicatively coupling of remote units 512(M)(2) to 512(M)(Q) in a daisy-chain arrangement. Remote unit 512(1)(N) is shown as being communicatively coupled to the central unit 502 via communications media 510(1-C).

The remote units 512(1)(1)-512(1)(N) on floor 1 are configured to receive uplink communications signals 506U(1)(1)-506U(1)(N) from client devices 508. The remote units 512(2)(1)-512(2)(P) on floor 2 are configured to receive uplink communications signals 506U(2)(1)-506U(2)(P) from the client devices 508. The remote units 512(M)(1)-512(M)(Q) on floor M are configured to receive uplink communications signals 506U(M)(1)-506U(M)(Q) from the client devices 508. The remote units 512(1)(1)-512(1)(N), 512(2)(1)-512(2)(P), 512(M)(1)-512(M)(Q) are configured to distribute their received uplink communications signals 506U(1)(1)-506U(1)(N), 506U(2)(1)-506U(2)(P), 506U(M)(1)-506U(M)(Q) between respective adjacent remote units 512 among the remote units 512(1)(1)-512(1)(N), 512(2)(1)-512(2)(P), 512(M)(1)-512(M)(Q) over the respective communications media 510(1)(1-2)-510(1)(2-N), 510(2)(1-2)-510(2)(2-P), 510(M)(1-2)-510(M)(2-Q) in a daisy-chain configuration so that the uplink communications signals 506U(1)(1)-506U(1)(N), 506U(2)(1)-506U(2)(P), 506U(M)(1)-506U(M)(Q) eventually reach remote unit 512(1)(N) to be distributed to the central unit 502, shown collectively as uplink communications signals 506U. For example, remote unit 512(M)(1) is upstream communicatively coupled to radio source remote unit 512(R). Remote unit 512(M)(Q) is downstream communicatively coupled to radio source remote unit 512(R).

With continuing reference to FIG. 5A, the DCS 500 also includes a radio source remote unit 512(R), which is remote unit 512(M)(2) in this example. The radio source remote unit 512(R) is directly communicatively coupled via a direct communicative coupling 514(R) to the remote radio source 504(R) for distributing downlink communications signals 506D(R) and uplink communication signals 506U(R) between the remote radio source 504(R) and other remote units 512 in the DCS 500. Just as for the radio sources 504(1)-504(A), the remote radio source 504(R) could be any type of radio source that is configured to distribute communications signals. For example, the remote radio source 504(R) could be a cellular base station. The direct communicative coupling 514(R) between the remote radio source 504(R) and the radio source remote unit 512(R) could be a direct or indirect physically connected coupling, such as electrical conducting wire or optical fiber as non-limiting examples. The direct communicative coupling 514(R) between the remote radio source 504(R) and the radio source remote unit 512(R) could also be a wireless coupling as a non-limiting example.

In addition to being able to exchange the downlink and remote uplink communications signals 506D(1)-506D(A), 506U(R) with the central unit 502, the radio source remote unit 512(R) is also configured to receive remote downlink communications signals 506D(R) from the remote radio source 512(R) through the direct communicative coupling 514(R). The radio source remote unit 512(R) is then configured to distribute the received remote downlink communications signals 506D(R) to a client device 508 communicatively coupled to the radio source remote unit 512(R). The radio source remote unit 512(R) is also configured to distribute the received remote downlink communications signals 506D(R) to the other remote units 512 in the daisy-chain communication arrangement. The radio source remote unit 512(R) is also configured to distribute remote uplink communications signals 506U(R) received from a client device 508 to the remote radio source 504(R) as remote uplink communications signals 506U(R).

With continuing reference to FIG. 5A, the radio source remote unit 512(R) is also configured to distribute received uplink communications signals 506U(1)(1)-506U(1)(N), 506U(2)(1)-506U(2)(P), 506U(M)(1)-506U(M)(Q) received by one or more of the other remote units 512(1)(1)-512(1)(N), 512(2)(1)-512(2)(P), 512(M)(1), 512(M)(3)-512(M)(Q) to the remote radio source 504(R) as remote uplink communications signals 506U(R). For example, the uplink communications signals 506U(1)(1)-506U(1)(N), 506U(2)(1)-506U(2)(P), 506U(M)(1)-506U(M)(Q) may be responses to distribution of the remote downlink communications signals 506D(R) by the radio source remote unit 512(R) to the other respective remote units 512(1)(1)-512(1)(N), 512(2)(1)-512(2)(P), 512(M)(1), 512(M)(3)-512(M)(Q). In this example, the uplink communications signals 506U(1)(1)-506U(1)(N), 506U(2)(1)-506U(2)(P), 506U(M)(1)-506U(M)(Q) can be received by the radio source remote unit 512(R) as remote uplink communications signals 506U(R) through the daisy-chain communicative coupling of the remote units 512 to each other in a daisy-chain configuration.

Figure 5B:
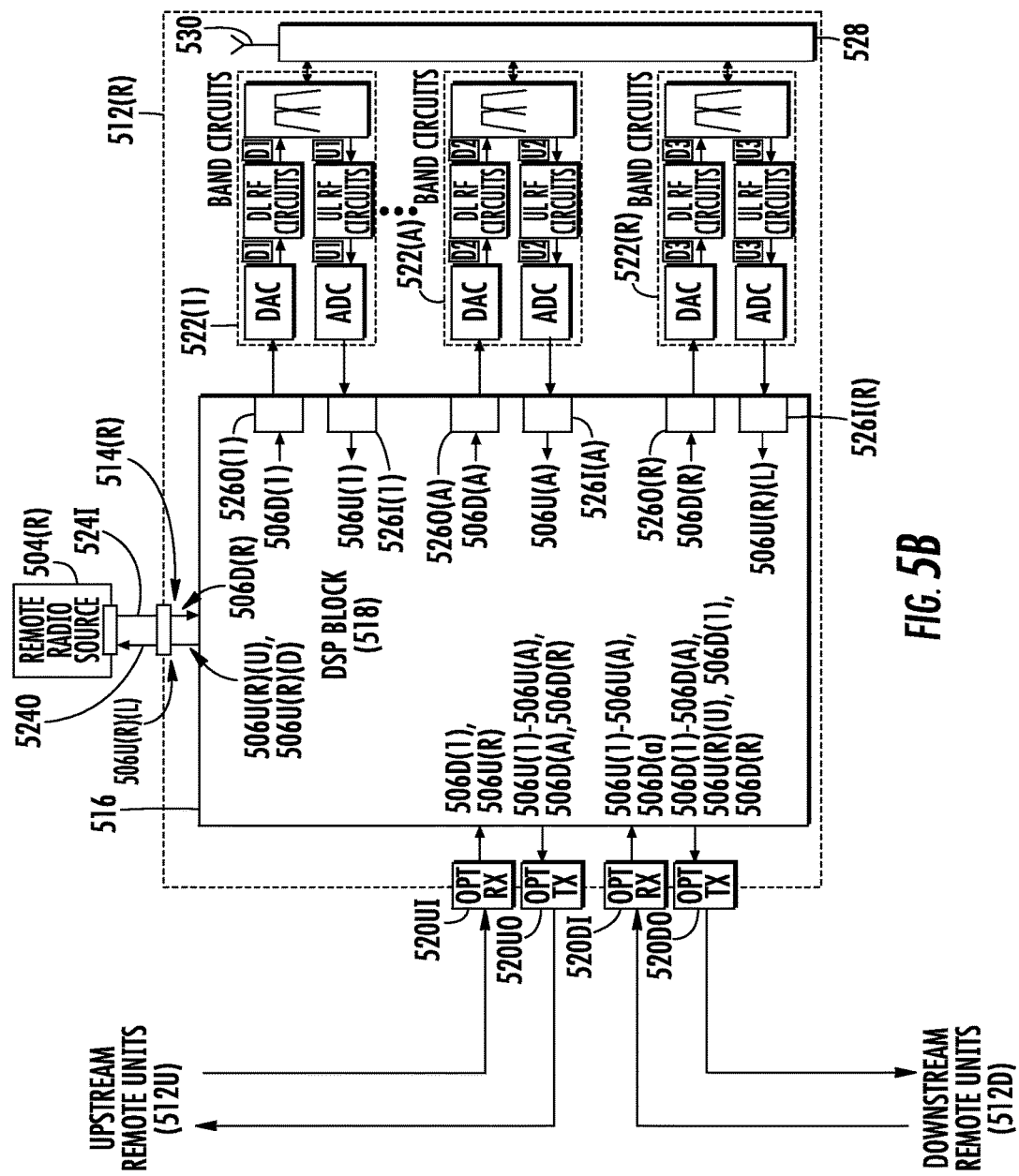
FIG. 5B is a schematic diagram of an exemplary radio source remote unit that can be provided in the DCS in FIG. 5A, wherein the radio source remote unit supports direct communicative coupling to a remote radio source and another remote unit(s) in a daisy-chain configuration, for distributing communications signals between the remote radio source and other daisy-chained remote units in the DCS.

FIG. 5B is a schematic diagram of an exemplary radio source remote unit 512(R) in the DCS 500 in FIG. 5A. As discussed above, the radio source remote unit 512(R) supports direct communicative coupling to the remote radio source 504(R) and a daisy-chain communicative coupling to other remote units 512 in the DCS 500 in FIG. 5A, for distributing communications signals. In this regard, the radio source remote unit 512(R) in this example includes a processing circuit 516 in the form of digital signal processor (DSP) block 518 in this example. The DSP 518 is configured to receive and distribute communications signals between various interfaces to support distribution of communications signals to and from the central unit 502, to and from the directly coupled remote radio source 504(R), and to and from other adjacent coupled remote units 512. It should be noted that the remote radio source 504(R) and the radio sources 504(1)-504(A) may generate more than a single channel. However for simplifying the explanation, it is assumed that the remote radio source 504(R) and the radio sources 504(1)-504(A) provide a service in a single channel.

In this regard, the radio source remote unit 512(R) includes an upstream input interface 520UI and an upstream output interface 520UO for distributing communications signals to and from an upstream communicatively coupled remote unit 512U. In this example, the upstream input interface 520UI is an optical interface. The upstream input interface 520UI is configured to receive the downlink communications signal 506D(1) as optical downlink communication signals from an upstream remote unit 512U. As discussed below, the DSP block 518 distributes the downlink communications signal 506D(1) to respective band circuit 522(1) to be distributed wirelessly to client devices 508. Also in this example, the DSP block 518 is also configured to receive the remote upstream uplink communications signals 506U(R)(U) through the upstream input interface 520UI to be distributed to the remote radio source 504(R). This is in response to the received remote downlink communications signals 506D(R) being distributed to other remote units 512 over the upstream output interface 520UO. The DSP block 518 is also configured to distribute the downlink communications signals 506D(A) received from a downstream remote unit 512D discussed in more detail below over the upstream output interface 520UO to provide this signal to the upstream remote unit 512U. The DSP block 518 is also configured to distribute the uplink communications signals 506U(1)-506U(A) received from the band circuits 522(1)-522(A) from client devices 508 over the upstream output interface 520UO to provide these signals to the upstream remote unit 512U.

With continuing reference to FIG. 5B, the DSP block 518 is also configured to distribute communications signals to and from a communicatively coupled downstream remote unit 512D. In this regard, the radio source remote unit 512(R) includes a downstream input interface 520DI and a downstream output interface 520DO for distributing communications signals to and from a downstream communicatively coupled remote unit 512D. In this example, the downstream input interface 520DI is an optical interface. The downstream input interface 520DI is configured to receive the uplink communications signals 506U(1)-506U(A) from downstream remote units 512D as optical downlink communication signals. The DSP block 518 distributes the received uplink communications signals 506U(1)-506U(A) to the upstream remote unit 512U through the upstream output interface 520UO. Also in this example, the DSP block 518 is configured to receive the downlink communications signals 506D(2) from a downstream remote unit 512D through the downlink input interface 520DI to be distributed to the band circuit 522(A). The DSP block 518 is also configured to distribute the downlink communications signals 506D(1)-506D(A) received from an upstream remote unit 512U over the upstream input interface 520UI to provide these signals to a downstream remote unit 512D over a downstream output interface 520DO. The DSP block 518 is also configured to distribute the remote upstream uplink communications signal 506U(R)(U) received from the upstream remote unit 512U over the upstream input interface 520UI, to the downstream remote unit 512D over the downstream output interface 520DO. The DSP block 518 is also configured to distribute the downlink communications signal 506D(1) received from the upstream remote unit 512U over the upstream input interface 520UI, to the downstream remote unit 512D over the downstream output interface 520DO. The DSP block 518 is also configured to distribute the remote downlink communications signal 506D(R) received from the remote radio source 504R over the direct communicative coupling 514(R) to the downstream remote unit 512D over the downstream output interface 520DO.

With continuing reference to FIG. 5B, the DSP block 518 is configured to distribute the downlink communications signals 506D(1)-506D(A), 506D(R) to respective client device output interfaces 526O(1)-526O(A), 526O(R) to respective band circuits 522(1)-522(A), 522(R) to be distributed to respective client devices 508. In this regard, the client device output interfaces 526O(1)-526O(A), 526O(R) are coupled to respective band circuits 522(1)-522(A), 522(R) to process the received downlink communications signals 506D(1)-506D(A), 506D(R) before being wirelessly transmitted to client devices 508. For example, each band circuit 522(1)-522(A), 522(R) may include a digital-to-analog converter (DAC) coupled to respective client device output interfaces 526O(1)-526O(A), 526O(R) as shown in FIG. 5B, to convert the received downlink communications signals 506D(1)-506D(A), 506D(R) from a digital format to an analog format. Each band circuit 522(1)-522(A), 522(R) may also include downlink (DL) RF circuits, as shown in FIG. 5B, to process (e.g., filter) the received downlink communications signals 506D(1)-506D(A), 506D(R) into different radio bands. The DSP block 518 may have also filtered the downlink communications signals 506D(1)-506D(A), 506D(R) before being distributed to the different client device output interfaces 526O(1)-526O(A), 526O(R). The processed downlink communications signals 506D(1)-506D(A), 506D(R) can then be wirelessly transmitted through wireless interface 528 to one or more antennas 530 to be wirelessly transmitted.

With continuing reference to FIG. 5B, the DSP block 518 is also configured to receive uplink communications signals 506U(1)-506U(A) and remote uplink communications signals 506U(R) from client devices through respective client device input interfaces 526I(1)-526I(A), 526I(R). In this regard, the antenna 530 is configured to wirelessly receive the uplink communications signals 506U(1)-506U(A) and remote local uplink communication signals 506U(R) and provide such signals to the respective band circuits 522(1)-522(A), 522(R) via the wireless interface 528. The received uplink communications signals 506U(1)-506U(A) and remote local uplink communications signals 506U(R)(L) are provided to respective uplink (UL) RF circuits in the band circuits 522(1)-522(A), 522(R) for processing (e.g., filtering). The received uplink communications signals 506U(1)-506U(A) and remote local uplink communications signals 506U(R)(L) may also be provided to respective analog-to-digital converters (ADCs) to convert the uplink communications signals 506U(1)-506U(A) and remote local uplink communications signals 506U(R)(L) from an analog to a digital format, if for example, the DSP block 518 is configured to process signals in a digital format, as is the case in this example with the DSP block 518. The received uplink communications signals 506U(1)-506U(A) and remote local uplink communications signals 506U(R)(L) are then provided by the respective band circuits 522(1)-522(A), 522(R) to respective client device input interfaces 526I(1)-526I(A), 526I(R) to be provided to the DSP block 518. As previously discussed, the DSP block 518 is configured to route or distribute the received uplink communications signals 506U(1)-506U(A) to the upstream remote unit 512U over the upstream output interface 520UO. The DSP block 518 is configured to route or distribute the received remote local uplink communications signals 506U(R) and remote upstream uplink communications signals 506U(R)(U) to the downstream output interface 520DO to be provided to the downstream remote unit 512D.

With continuing reference to FIG. 5B, the DSP block 518 is also configured to distribute the received remote upstream uplink communications signals 506U(R)(U), remote downstream uplink communications signals 506U(R)(D), and remote local uplink communications signals 506U(R)(L) to the remote output interface 5240 to be provided to the remote radio source 504(R). The DSP block 518 is also configured to receive the remote downlink communications signals 506D(R) over a remote input interface 5241 to be routed to the upstream remote unit 520U and the downstream remote unit 520D, as previously described.

A distributed antenna system (DAS) is one exemplary type of DCS that can include one or more radio source remote units configured to be directly communicatively coupled to a remote radio source for exchanging remote downlink and uplink communications signals between the remote radio source and the DAS.

Figure 6:
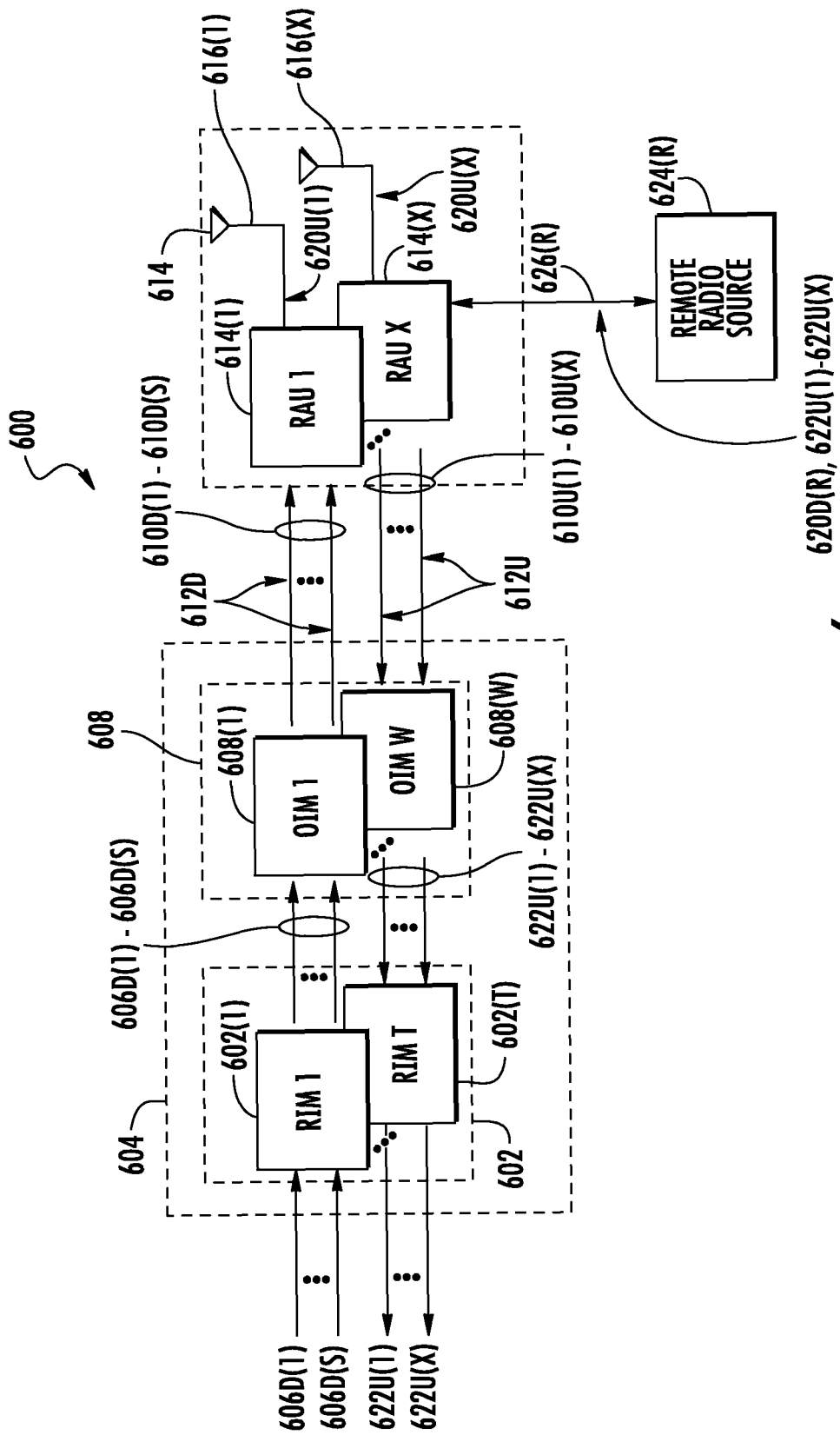
FIG. 6 is a schematic diagram of an exemplary DCS provided in the form of an optical fiber-based distributed antenna system (DAS) that includes a central unit configured to distribute communications signals over optical fiber to a plurality of remote units, wherein at least one remote unit is a radio source remote unit directly communicatively coupled to a remote radio source(s) for distributing communications signals between the remote radio source(s) and other remote units in the DCS.

In this regard, FIG. 6 is a schematic diagram of exemplary DAS 600. The DAS 600 in this example is an optical fiber-based DAS. The DAS 600 in this example is comprised of three (3) main components. One or more radio interfaces provided in the form of radio interface modules (RIMs) 602(1)-602(T) are provided in a central unit 604 to receive and process downlink electrical communications signals 606D(1)-606D(S) prior to optical conversion into downlink optical communications signals. The downlink electrical communications signals 606D(1)-606D(S) may be received from a base station (not shown) as an example. The RIMs 602(1)-602(T) provide both downlink and uplink interfaces for signal processing. The notations "1-S" and "1-T" indicate that any number of the referenced component, 1-S and 1-T, respectively, may be provided.

With continuing reference to FIG. 6, the central unit 604 is configured to accept the 6 plurality of RIMs 602(1)-902(T) as modular components that can easily be installed and removed or replaced in the central unit 04. In one embodiment, the central unit 604 is configured to support up to twelve (12) RIMs 602(1)-602(12). Each RIM 602(1)-602(T) can be designed to support a particular type of radio source or range of radio sources (i.e., frequencies) to provide flexibility in configuring the central unit 604 and the multi-frequency DAS 600 to support the desired radio sources. For example, one RIM 602 may be configured to support the Personal Communication Services (PCS) radio band. Another RIM 602 may be configured to support the 700 MHz radio band. In this example, by inclusion of these RIMs 602, the central unit 604 could be configured to support and distribute communications signals on both PCS and LTE 700 radio bands, as an example. RIMs 602 may be provided in the central unit 604 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 602(1)-602(T) may also be provided in the central unit 604 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 602(1)-602(T) may be provided in the central unit 604 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 6, the downlink electrical communications signals 606D(1)-606D(S) are provided to a plurality of optical interfaces provided in the form of optical interface modules (OIMs) 608(1)-608(W) in this embodiment to convert the downlink electrical communications signals 606D(1)-606D(S) into downlink optical communications signals 610D(1)-610D(S). The OIMs 608 may be configured to provide one or more optical interface components (OICs) that contain optical-to-electrical (O/E) and electrical-to-optical (E/O) converters, as will be described in more detail below. The OIMs 608 support the radio bands that can be provided by the RIMs 602, including the examples previously described above.

The OIMs 608(1)-608(W) each include E/O converters to convert the downlink electrical communications signals 606D(1)-606D(S) into the downlink optical communications signals 610D(1)-610D(S). The downlink optical communications signals 610D(1)-610D(S) are communicated over downlink optical fiber communications medium 612D to a plurality of remote units provided in the form of remote antenna units 614(1)-614(X), which may be remote antenna units. The notation "1-X" indicates that any number of the referenced component 1-X may be provided. O/E converters provided in the remote antenna units 614(1)-614(X) convert the downlink optical communications signals 610D(1)-610D(S) back into the downlink electrical communications signals 606D(1)-606D(S), which are provided to antennas 616(1)-616(X) in the remote antenna units 614(1)-614(X) to user equipment (not shown) in the reception range of the antennas 616(1)-616(X).

E/O converters are also provided in the remote antenna units 614(1)-614(X) to convert uplink electrical communications signals 620U(1)-620U(X) received from user equipment (not shown) through the antennas 616(1)-616(X) into uplink optical communications signals 610U(1)-610U(S). The remote antenna units 614(1)-614(X) communicate the uplink optical communications signals 610U(1)-610U(S) over an uplink optical fiber communications medium 612U to the OIMs 608(1)-608(W) in the central unit 604. The OIMs 608(1)-608(W) include O/E converters that convert the received uplink optical communications signals 610U(1)-610U(S) into uplink electrical communications signals 622U(1)-622U(X), which are processed by the RIMs 602(1)-602(T) and provided as uplink electrical communications signals 622U(1)-622U(X). The central unit 604 may provide the uplink electrical communications signals 622U(1)-622U(X) to a base station or other communications system.

Note that the downlink optical fiber communications medium 612D and uplink optical fiber communications medium 612U connected to each remote antenna unit 614(1)-614(X) may be a common optical fiber communications medium, wherein for example, wave division multiplexing (WDM) may be employed to provide the downlink optical communications signals 610D(1)-610D(S) and the uplink optical communications signals 610U(1)-610U(S) on the same optical fiber communications medium.

With continuing reference to FIG. 6, the remote antenna unit 614(X) is a radio source remote antenna unit. The remote antenna unit 614(X) is directly communicatively coupled to a remote radio source 624(R) through a direct communicative coupling 926(R). The radio source remote antenna unit 614(X) is configured to receive remote downlink communications signals 620D(R) from the remote radio source 624(R) to be distributed to one or more of other remote antenna units 614(1)-614(X−1). In this example, the radio source remote antenna unit 614(X) distributes the received remote downlink communications signals 620D(R) to the central unit 604 to then be distributed to one or more other remote antenna units 614(1)-614(X−1). However, the radio source remote antenna unit 614(X) could also be configured to distribute the received remote downlink communications signals 620D(R) directly to one or more other remote antenna units 614(1)-614(X−1) in a daisy-chain configuration, if the remote antenna units 614(1)-614(X) in the DAS 600 were configured in a daisy-chain configuration. All of the exemplary discussion above with regard to radio source remote units, remote radio sources, and DCSs can be applied to the example DAS 600 in FIG. 6.

Figure 7:
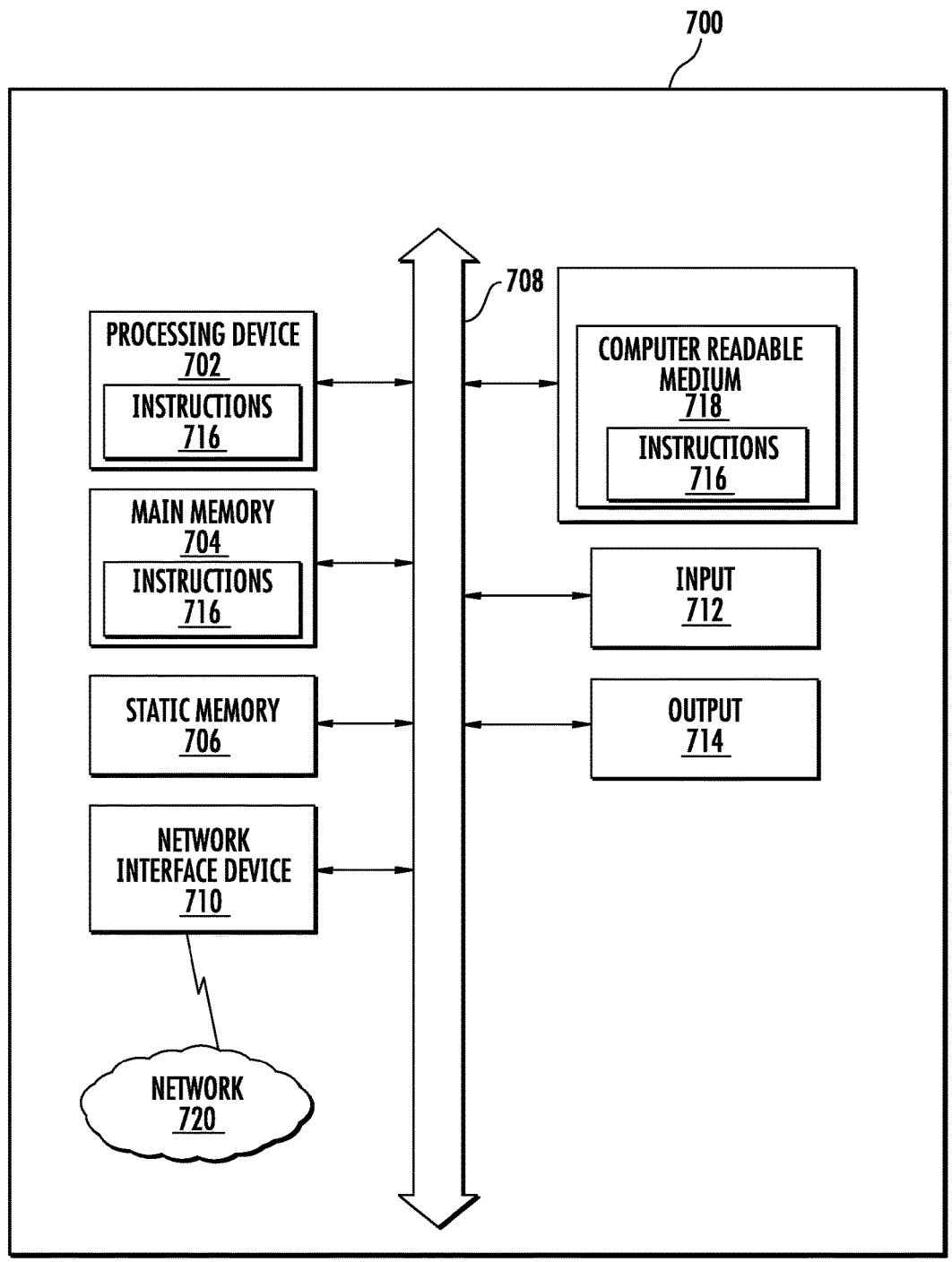
FIG. 7 is a schematic diagram of a generalized representation of an exemplary controller that can be included in any central unit or remote unit in a DCS that includes at least one radio source remote unit directly communicatively coupled to a remote radio source(s) for distributing communications services for the remote radio source(s) and other remote units in the DCS, wherein the exemplary computer system is adapted to execute instructions from an exemplary computer readable medium.

FIG. 7 is a schematic diagram representation of additional detail illustrating a computer system 700 that could be employed in a radio source remote unit, including those described above, for exchanging downlink and uplink remote communications signals with a remote radio source in a DCS. In this regard, the computer system 700 is adapted to execute instructions from an exemplary computer-readable medium to perform these and/or any of the functions or processing described herein.

In this regard, the computer system 700 in FIG. 7 may include a set of instructions that may be executed to predict frequency interference to avoid or reduce interference in a multi-frequency DAS. The computer system 700 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 700 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 700 in this embodiment includes a processing device or processor 702, a main memory 704 (e.g., read-only memory (ROM), flash memory, dynamic random access memory (DRAM), such as synchronous DRAM (SDRAM), etc.), and a static memory 706 (e.g., flash memory, static random access memory (SRAM), etc.), which may communicate with each other via a data bus 708. Alternatively, the processor 702 may be connected to the main memory 704 and/or static memory 706 directly or via some other connectivity means. The processor 702 may be a controller, and the main memory 704 or static memory 706 may be any type of memory.

The processor 702 represents one or more general-purpose processing devices, such as a microprocessor, central processing unit, or the like. More particularly, the processor 702 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 702 is configured to execute processing logic in instructions for performing the operations and steps discussed herein.

The computer system 700 may further include a network interface device 710. The computer system 700 also may or may not include an input 712, configured to receive input and selections to be communicated to the computer system 700 when executing instructions. The computer system 700 also may or may not include an output 714, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 700 may or may not include a data storage device that includes instructions 716 stored in a computer-readable medium 718. The instructions 716 may also reside, completely or at least partially, within the main memory 704 and/or within the processor 702 during execution thereof by the computer system 700, the main memory 704 and, the processor 702 also constituting computer-readable medium. The instructions 716 may further be transmitted or received over a network 720 via the network interface device 710.

While the computer-readable medium 718 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of exchanging communications signals in a distributed communications system (DCS) with a remote radio source directly communicatively coupled to a remote unit in the DCS, comprising:
   receiving downlink communications signals in a central unit from at least one radio source communicatively coupled to the central unit;
   distributing the downlink communications signals from the central unit to be received by a plurality of remote units;
   receiving uplink communications signals in the central unit received by the plurality of remote units;
   receiving the downlink communications signals in one or more of the plurality of remote units;
   distributing the downlink communications signals from the one or more of the plurality of remote units to at least one client device;
   receiving uplink communications signals from the at least one client device;
   distributing the received uplink communications signals from one or more of the plurality of remote units to be received by the central unit;
   receiving remote downlink communications signals in a radio source remote unit among the plurality of remote units, from at least one remote radio source directly communicatively coupled to the radio source remote unit;

distributing the remote downlink communications signals from the radio source remote unit to at least one client device;

distributing the remote downlink communications signals from the radio source remote unit to be received by at least one other remote unit among the plurality of remote units;

distributing the uplink communications signals received from the at least one client device to the at least one remote radio source; and distributing the uplink communications signals received by at least one remote unit among the plurality of remote units to the at least one remote radio source.

2. The method of claim 1, comprising receiving the remote downlink communications signals in the radio source remote unit from the at least one remote radio source physically connected to the radio source remote unit.

3. The method of claim 2, comprising receiving the remote downlink communications signals in the radio source remote unit from the at least one remote radio source directly physically connected to the radio source remote unit.

4. The method of claim 1, comprising receiving the remote downlink communications signals in the radio source remote unit from the at least one remote radio source wirelessly connected to the radio source remote unit.

5. The method of claim 1, comprising:

distributing the downlink communications signals from the central unit directly to the plurality of remote units;

receiving the uplink communications signals in the central unit directly from the plurality of remote units;

receiving the downlink communications signals directly from the central unit in each of the plurality of remote units;

distributing the downlink communications signals from each of the plurality of remote units to at least one client device; and receiving the uplink communications signals from the at least one client device in each of the plurality of remote units.

6. The method of claim 5, comprising:

distributing the received uplink communications signals from each of the plurality of remote units directly to the central unit;

distributing the remote downlink communications signals from the radio source remote units directly to the central unit; and distributing the uplink communications signals received directly from the central unit to the at least one remote radio source.

7. The method of claim 1, comprising:

distributing the downlink communications signals to one or more upstream remote units among the plurality of remote units;

receiving upstream uplink communications signals from the one or more upstream remote units;

receiving the downlink communications signals in one or more downstream remote units among the plurality of remote units, from the one or more upstream remote units;

distributing the downlink communications signals from the one or more downstream remote units to at least one client device;

receiving the uplink communications signals from the at least one client device in the one or more downstream remote units; and distributing the received uplink communications signals from the one or more downstream remote units to the one or more upstream remote units.

8. The method of claim 7, comprising:

receiving upstream downlink communications signals in one or more radio source remote units among the plurality of remote units, from the one or more upstream remote units;

distributing the upstream downlink communications signals from the one or more radio source remote units to at least one client device;

distributing the uplink communications signals as upstream uplink communications signals from the one or more radio source remote units to the one or more upstream remote units;

receiving downstream downlink communications signals from the one or more downstream remote units in the one or more radio source remote units;

distributing the downstream downlink communications signals from the one or more radio source remote units to at least one client device; and distributing the uplink communications signals as downstream uplink communications signals from the one or more radio source remote units to the one or more downstream remote units.

9. The method of claim 8, further comprising:

distributing the received uplink communications signals from the at least one client device, from the one or more radio source remote units to the at least one remote radio source;

distributing the received upstream uplink communications signals from the one or more upstream remote units, from the one or more radio source remote units to the at least one remote radio source; and distributing the received downstream uplink communications signals from the one or more upstream remote units, from the one or more radio source remote units to the at least one remote radio source.

10. A remote unit for exchanging communications signals in a distributed communications system (DCS) comprising:

an input interface configured to receive downlink communications signals in a DCS;

a client device output interface configured to distribute the received downlink communications signals to at least one client device;

a client device input interface configured to receive uplink communications signals from the at least one client device;

an output interface configured to distribute the received uplink communications signals to be received by a central unit;

a remote input interface configured to receive remote downlink communications signals from one or more radio source remote units directly communicatively coupled to the remote unit;

the input interface configured to distribute the remote downlink communications signals to be received by at least one other remote unit among a plurality of remote units;

a remote output interface configured to distribute the uplink communications signals received from the at least one client device to at least one remote radio source; and the remote output interface configured to distribute the uplink communications signals received by the at least one other remote unit among the plurality of remote units to the at least one remote radio source.

11. The remote unit of claim 10, wherein:
the input interface is configured to receive the downlink communications signals directly from the central unit;
the client device output interface is configured to distribute the downlink communications signals to at least one client device; and
the client device input interface is configured to receive the uplink communications signals from the at least one client device.

12. The remote unit of claim 11, wherein:
the output interface is configured to distribute the received uplink communications signals directly to the central unit;
the input interface is configured to distribute the remote downlink communications signals directly to the central unit in the DCS; and
the remote output interface is configured to distribute the uplink communications signals received directly from the central unit to the at least one remote radio source.

13. The remote unit of claim 12, further comprising at least one band circuit configured to:
receive the downlink communications signals to be distributed to the at least one client device;
receive the remote downlink communications signals to be distributed to the at least one client device; and
receive the uplink communications signals from at least one client device.

14. The remote unit of claim 11, further comprising a digital processing circuit configured to:
route the remote downlink communications signals to the at least one client device;
route the remote downlink communications signals to be received by the at least one other remote unit among the plurality of remote units;
route the uplink communications signals received from the at least one client device to the at least one remote radio source; and
route the uplink communications signals received by at least one other remote unit among the plurality of remote units to the at least one remote radio source.

15. The remote device of claim 10, wherein:
the input interface comprises an upstream input interface configured to receive upstream downlink communications signals from one or more upstream remote units;
the client device output interface configured to distribute the upstream downlink communications signals to the at least one client device and distribute downstream downlink communications signals to the at least one client device;
an upstream output interface configured to distribute the uplink communications signals as upstream uplink communications signals to the one or more upstream remote units;
the input interface comprises a downstream input interface configured to receive downstream downlink communications signals from the one or more downstream remote units; and
the output interface further comprises a downstream output interface configured to distribute downstream uplink communications signals to the one or more downstream remote units.

16. The remote unit of claim 15, further comprising:
the remote output interface configured to distribute the received uplink communications signals from the at least one client device and the received upstream uplink communications signals from the one or more upstream remote units to the at least one remote radio source; and
the remote input interface configured to distribute the received downstream uplink communications signals from the one or more upstream remote units to the at least one remote radio source.

17. The remote unit of claim 16, further comprising at least one band circuit configured to:
receive the upstream downlink communications signals from the one or more upstream remote units to be distributed to at least one client device; and
filter the received upstream downlink communication signals to at least one radio-frequency (RF) band;
receive the uplink communications signals from at least one client device to be distributed as the upstream uplink communications signals to the one or more upstream remote units;
filter the received uplink communication signals to at least one radio-frequency (RF) band;
receive the downstream downlink communications signals from the one or more downstream remote units to be distributed to the at least one client device;
filter the received downstream downlink communications signals to at least one radio-frequency (RF) band;
receive the uplink communications signals from at least one client device to distribute the uplink communications signals as the downstream uplink communications signals to the one or more downstream remote units; and
filter the received uplink communication signals from the at least one client device to at least one radio-frequency (RF) band.

18. The remote unit of claim 10, further comprising a digital processing circuit configured to:
route the remote downlink communications signals to the at least one client device;
route the remote downlink communications signals to be received by the at least one other remote unit among the plurality of remote units;
route the uplink communications signals received from the at least one client device to the at least one remote radio source; and
route the uplink communications signals received by at least one other remote unit among the plurality of remote units to the at least one remote radio source.

* * * * *